US005802077A

United States Patent [19]
Yeh

[11] Patent Number: 5,802,077
[45] Date of Patent: Sep. 1, 1998

[54] METHOD AND APPARATUS FOR OBTAINING HIGH INTEGRITY AND AVAILABILITY IN A MULTI-CHANNEL SYSTEM

[75] Inventor: Ying Chin Yeh, Bellevue, Wash.

[73] Assignee: The Boeing Company, Seattle, Wash.

[21] Appl. No.: 441,580

[22] Filed: May 15, 1995

[51] Int. Cl.⁶ ................................................ G06F 11/08
[52] U.S. Cl. ........................ 371/36; 371/20.1; 370/242
[58] Field of Search ...................... 371/36, 67.1, 68.1, 371/48, 30, 20.1; 375/182.04; 370/242, 251

[56] References Cited

U.S. PATENT DOCUMENTS 5,349,654  9/1994  Bond et al. ........................ 395/575
5,550,736  8/1996  Hay et al. ........................ 364/424.03

*Primary Examiner*—Phung M. Chung
*Attorney, Agent, or Firm*—Christensen O'Connor Johnson & Kindness PLLC

[57] ABSTRACT

A multi-channel system (31) which monitors and identifies faults experienced by elements of the system is provided in accordance with the present invention. The multi-channel system comprises a plurality of line replaceable units (30 or 38) and independent control channels (40, 42 and 44) coupled to a global bus (34). The control channels and the line replaceable units are coupled to the global bus such that each computer channel and each line replaceable unit is a, transmitter that transmits messages via the global bus. Each channel contains a plurality of lanes (46, 48 and 50) coupled by a private bus (56), wherein each lane comprises a power supply (52), a processor (54) and an interface (60) to the global bus. However, only one lane of each channel, i.e. the command lane, may transmit messages via the global bus. The processor of each lane of each channel generates a channel majority opinion for each transmitter connected to the global bus that indicates whether a majority of the channels have detected a fault in the transmitter. To determine the channel majority opinion, the processor for each lane of the channel must first generate a lane majority opinion of the channel that indicates whether a majority of the lanes of the channel have detected a fault in the transmitter communicating via the global bus. The command lane of each channel then transmits the lane majority opinion of the channel to each of the other channels via the global bus such that each lane of each channel receives the lane majority opinion generated by the command lane of each of the other channels.

38 Claims, 16 Drawing Sheets

METHOD AND APPARATUS FOR OBTAINING HIGH INTEGRITY AND AVAILABILITY IN A MULTI-CHANNEL SYSTEM

FIELD OF THE INVENTION

The present invention generally relates to multi-channel, fly-by-wire, avionic control systems, and more specifically, to a method and apparatus for obtaining high integrity and availability in multi-channel, fly-by-wire, avionic control systems.

BACKGROUND OF THE INVENTION

Prior to the advent of fly-by-wire technology, the flight control surfaces on a commercial aircraft were controlled using a complex system of cables and mechanical controls. With the advent of fly-by-wire technology, such mechanical control systems were replaced with a fly-by-wire system having no direct mechanical couplings between pilot controls and flight control surfaces. Instead of using mechanical couplings such as cables, a fly-by-wire system includes pilot control transducers which sense the position of the pilot controls and generate electrical signals proportional to the position of the pilot controls. The electrical signals are combined with other airplane data in the primary flight computer to produce a flight control surface command that controls the movement of the flight control surfaces of the commercial aircraft.

Because safety is always a high priority in the aircraft industry, fly-by-wire systems usually include redundant components so that if one component of the system fails, a pilot can still safely control the aircraft. An example of such a fly-by-wire system is described in commonly assigned U.S. patent application Ser. No. 07/893,339, entitled Multi-Access Redundant Fly-By-Wire Primary Flight Control System, to Buus, filed Jun. 3, 1992, the disclosure and drawings of which are specifically incorporated herein by reference. The described fly-by-wire system is divided into a series of independent control channels wherein each control channel within the system is substantially isolated from the other control channels. Consequently, a malfunction occurring in one channel does not affect the continued operation of the remaining channels such that a pilot can fly the aircraft using only one channel. This typical fly-by-wire system includes many other redundant systems to ensure the safety of passengers and crew. For example, it includes autopilot flight director computers, air data modules, engine indication and crew alerting systems, airplane information management systems, etc. The independent control channels are in direct communication with these aircraft systems via a global communications data bus. However, each component of the fly-by-wire system, including the global communication data bus, comprises a potential weak link that can cause a problem in the event of a failure of that component or in the event of a broken or loose connection to that component. If the problem goes undetected, or if the problem is not identified correctly, the results can be catastrophic.

Consequently, there is a need to provide fly-by-wire systems with the ability to monitor and identify failures or faults in aircraft components. Due to the very stringent safety requirements applied to the fly-by-wire system, it is necessary that a high level of integrity be obtained such that the numerical probability of experiencing a failure in the system, whether a passive failure resulting in loss of function without significant immediate aircraft transient or an active failure resulting in aircraft component malfunction with significant immediate airplane transient, is less than 1.0E–10 per flight hour. The availability of the system should be maximized by avoiding nuisance condemnation of aircraft components while achieving the required level of integrity described above. Further, there is a need in such a system to distinguish between faults occurring in the independent control channels and faults occurring in the global communication bus and other aircraft components. The present invention is directed to filing these and other needs of fly-by-wire avionic control systems.

SUMMARY OF THE INVENTION

In accordance with this invention, multi-channel system that monitors and identifies faults experienced by elements of the system is provided by the present invention. The multi-channel system comprises a plurality of line replaceable units and independent control channels coupled to a global bus. The control channels and the line replaceable units are coupled to the global bus such that each computer channel and each line replaceable unit is a transmitter that transmits messages via the global bus. Each channel contains a plurality of lanes coupled by a private bus, wherein each lane comprises a power supply, a processor and an interface to the global bus. However, only one lane of each channel, i.e., the command lane, may transmit messages via the global bus.

Each computer channel monitors and detects faults in the multi-channel system in the same manner. Consequently, only the operation of the lanes of one channel is summarized. Accordingly, the processor of each lane of the channel generates a channel majority opinion for each transmitter connected to the global bus that indicates whether a majority of the channels have detected a fault in the transmitter. To determine the channel majority opinion, the processor for each lane of the channel must first generate a lane majority opinion of the channel that indicates whether a majority of the lanes of the channel have detected a fault in the transmitter communicating via the global bus. The command lane of each channel then transmits the lane majority opinion of the channel to each of the other channels via the global bus.

After each lane of the channel receives the lane majority opinion generated by the command lane of each channel, the processor of each lane of the channel qualifies the lane majority opinion of each channel to ensure that the fault detected is not due to a fault in the channel whose command lane sent the lane majority opinion. If that channel is not experiencing a fault, the processor of each lane generates a qualified lane majority opinion for that channel indicating whether the majority of lanes of that channel have detected a fault in the transmitter. After the processor of each lane generates a qualified majority opinion for each channel in this manner, the processor transmits the qualified majority opinion to the other lanes of the channel via the private bus of the channel.

Next, the processor of each lane generates a final lane majority opinion of each channel. The final lane majority opinion of each channel indicates whether a majority of the lanes of the channel have continued to detect the fault in the transmitter after the lane majority opinion of the channel has been qualified. Thus, the final lane majority opinion indicates whether the transmitter is experiencing a fault. The final lane majority opinion of each channel is generated by the processor of each lane by determining if a majority of the lanes of the channel have persistently generated a qualified lane majority opinion for the channel indicating that the transmitter is experiencing the fault.

Finally, the processor of each lane of the channel generates the channel majority opinion by determining if a majority of the channels have persistently generated a final majority opinion for the channel indicating that the transmitter is experiencing a fault.

In other preferred embodiments of the present invention, the channel majority opinion is further processed by the processor of each lane to identify the type of fault the transmitter is experiencing, i.e, whether the fault is intermittent or constant, to identify faults in the global bus and to identify faults within the channels.

A method generally consistent with the functions implemented by the elements of the multi-channel system described above is a further aspect of this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
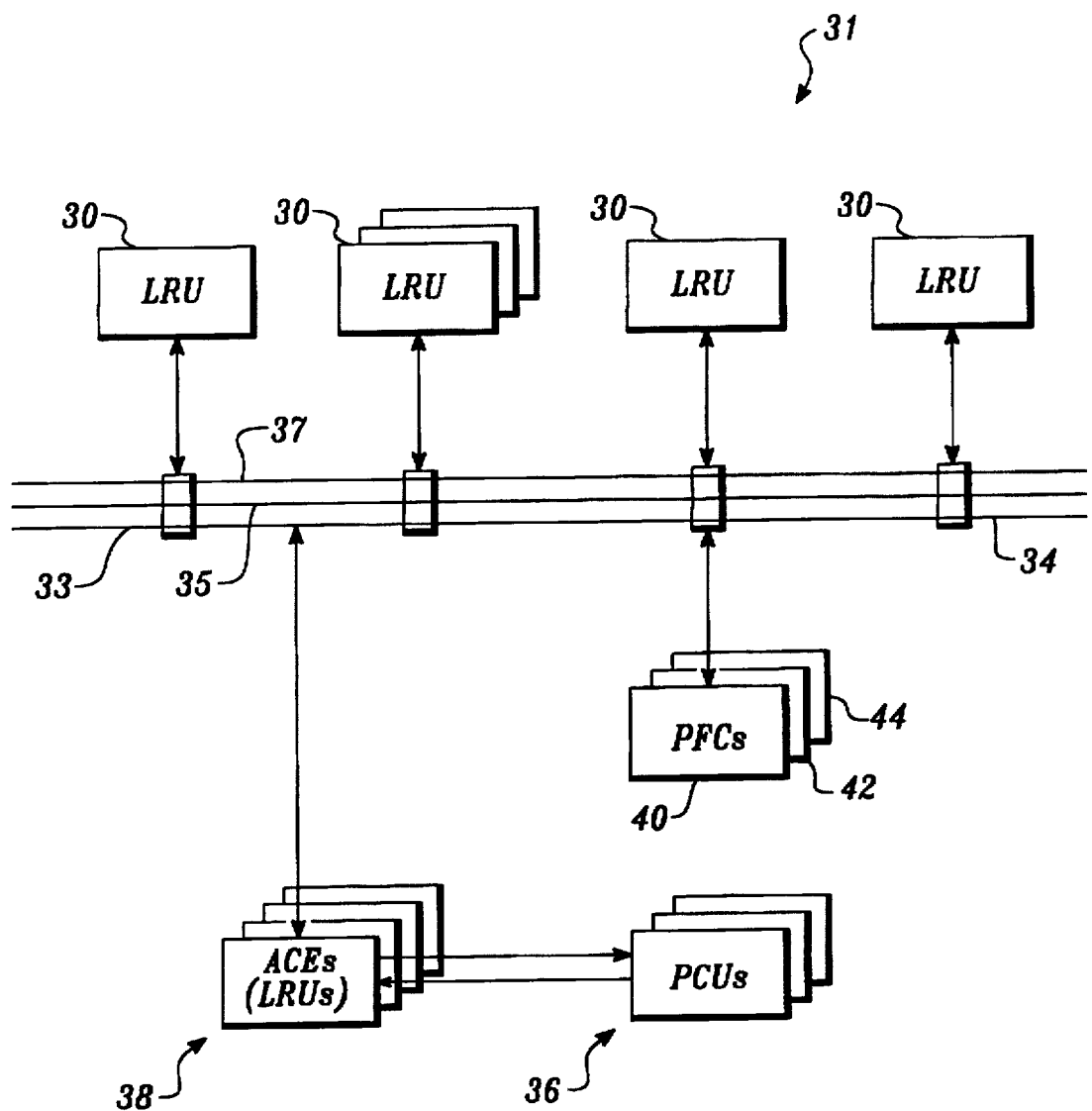
FIG. 1 is a block diagram of a multi-channel, fly-by-wire system including three channels (i.e., three primary flight computers or "PFCs") connected to a plurality of line replaceable units (LRUs) via a global communication bus.

A block diagram of a multi-channel, fly-by-wire, avionic critical control system 31 is shown in FIG. 1. The fly-by-wire system 31 includes three independent and isolated flight control channels, i.e., three independent and isolated primary flight computers or PFCs, including a left flight control channel 40, a center flight control channel 42 and a right flight control channel 44 (the term "channel" and the term "PFC" will be used interchangeably throughout the following description). The control channels 40, 42 and 44 are physically and electrically isolated from each other such that failure in one of the channels does not adversely affect the operation of the other channels. In order to achieve such isolation, the three independent control channels must operate asynchronously. However, asynchronous operation causes a time delay between channel functions. One of ordinary skill in the art of avionics will recognize that such delays are accounted and accommodated for by various fly-by-wire system parameters. However, these parameters are not described because an understanding of them is not believed to be necessary to an understanding of the present invention.

Each channel or PFC 40, 42 and 44 transmits, and receives flight control signals to and from the other avionic components of the aircraft via a global communication bus 34. These avionic components include: autopilot flight director computers, air data modules, engine indication and crew alerting systems, airplane information management systems, etc. Since the type of avionic component and the function and purpose of each avionic component is immaterial for purposes of describing the present invention, these components are generally referred to and identified in FIG. 1 as line replaceable units (LRUs) 30, which is a known term in the prior art used to describe avionic components that may be manually plugged in and removed from the aircraft as a unit.

Each of the LRUs 30 transmits data to the PFCs 40, 42 and 44 via the global communication bus 34 for use in determining control surface commands. The global communication bus 34 comprises three data busses, a left-bus 33, a center-bus 35 and a right-bus 37. In the preferred embodiment, the data busses 33, 35 and 37 are ARINC 629 digital communication links which are standard in the aircraft industry; however, other types of data communication links could be used.

Each flight control channel of the control system controls each of the aircraft's flight control surfaces via a particular type of LRU, i.e, an actuator controller electronics (ACE) units 38 such that a pilot can fly the aircraft using only one channel. In this regard, a number of redundant ACEs 38 receive pilot control signals from the column, wheel, pedals, rudder, etc. of the aircraft (not shown). The ACEs 38 then transmit the pilot control signals to each channel 40, 42, and 44 via the global communication bus 34. The channels generate a series of flight surface commands based on the pilot control signals received from the ACEs and the data received from the LRUs 30, and transmit the flight surface commands back to the ACEs 38 via the global communication bus 34. The ACEs 38 perform a digital to analog conversion of the flight surface commands generated by each of the channels and transmit the converted signals to a plurality of power control units (PCUs) 36, which control the movement of an individual flight control surface on the aircraft. Clearly, no errors should occur in communication between any of these avionic components occur via the global communication bus. As will be better understood from the following description, the present invention detects errors in communication between ACEs 38, the LRUs 30 and the channels 40, 42 and 44 via the global communication bus 34 and determines if the error is due to a permanent or intermittent fault in a specific LRU or in the global communication bus 34, or due to a fault within a channel itself. For purposes of the following description, it will be appreciated that the term "LRU" also refers to the ACEs.

Figure 2:
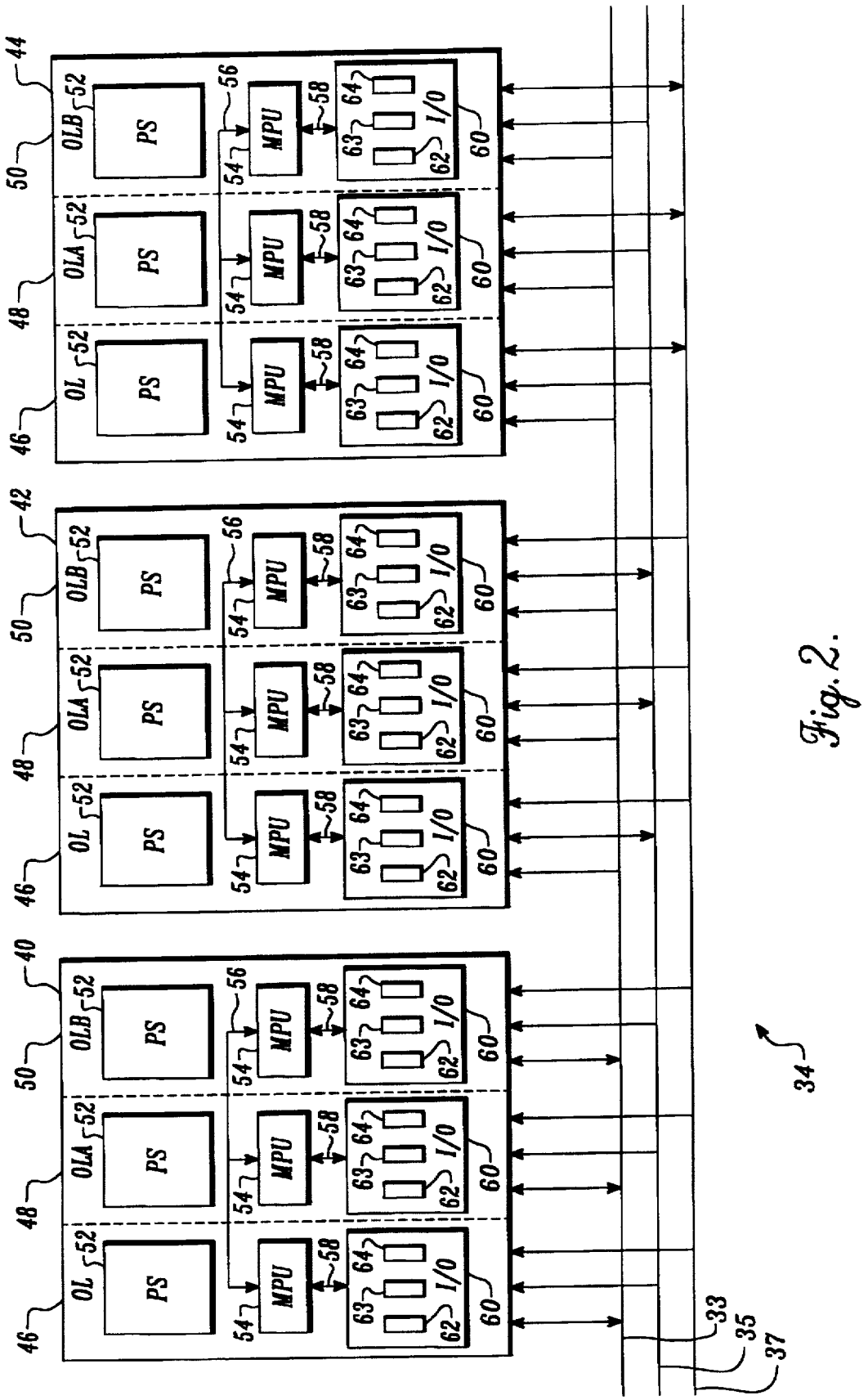
FIG. 2 is a more detailed block diagram of the PFCs shown in FIG. 1, wherein each PFC includes three computation lanes that are used to monitor and detect faults in the fly-by-wire system in accordance with the present invention.

FIG. 2 shows the internal components of each channel 40, 42, and 44 as coupled to the global communication bus 34. Because the channels 40, 42 and 44 are virtually identical, the following description of the left channel 40 applies equally to the center and right channels 42 and 44. Therefore, the center and right channels will not be discussed in detail.

The left channel 40 includes three redundant, computing lanes 46, 48 and 50. Each lane comprises a power supply (PS) 52, a microprocessing unit (MPU) 54 and an input/output interface (I/O) 60. The interface 60 of each lane allows the lane to be directly connected to the global communication bus 34. The MPUs 54 of each lane of the channel 40 are connected by a private, inter-lane data bus 54 that allows the MPUs 54 and thus, the lanes 46, 48 and 50 of the channel 40 to communicate with each other. However, in the preferred embodiment of the present invention, the microprocessor hardware of each MPU is dissimilar to facilitate detection of generic design errors present in any microprocessing chip. For example, the microprocessing unit 54 of lane 46 may comprise the 29050 microprocessor chip manufactured by Advanced Micro Devices, MPU 54 of lane 48 may comprise the 68040 microprocessor chip manufactured by Motorola, and the MPU 54 of lane 50 may comprise the 80486 microprocessor chip manufactured by Intel. One of ordinary skill in the art will recognize that the MPUs 54 include many more components than those shown in FIG. 2, however, such other components are not described because they are conventional, and an understanding of them is not believed to be necessary to an understanding of the present invention.

Regardless of the type, the MPU 54 of each lane 46, 48 and 50 is connected to the I/O interface 60 by an intra-lane data bus 58. The interface 60 is then coupled to the global communication bus 34 such that the interface can receive signals from the center bus 35 and the right bus 37, and can both send and receive data via the left bus 33. The interface 60 also includes three error registers 62, 63 and 64, one error register associated with each data bus 33, 35, or 37, in one preferred embodiment of the invention the error registers are 16-bit error registers. One of ordinary skill in the art will recognize that the interface 60 includes many more components than those shown in FIG. 2, however, such other components are not described because they are conventional, and an understanding of them is not believed to be necessary to an understanding of the present invention.

Although each lane 46, 48 and 50 is connected to the global communication bus 34, only one lane is allowed to transmit messages 78 over the global communication bus at any time. This lane is referred to as the "command lane." In the illustrated embodiment lane 46 of channel 40, lane 48 of channel 42 and lane 50 of channel 44 have been selected arbitrarily for discussion to represent the command lane of their respective channel. It will be appreciated by one of ordinary skill in the art, however, that based on the demands of the fly-by-wire system 31, any lane 46, 48 or 50 of any channel 40, 42 or 44 can be the command lane.

Figure 3A:
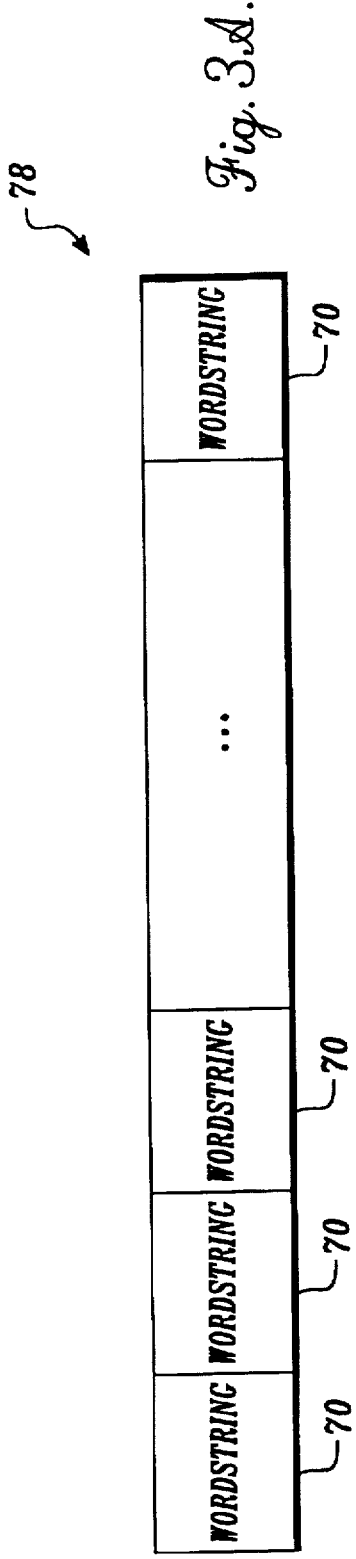
FIGS. 3A and 3B are block diagrams showing the form in which information is sent between the channels and the LRUs via the global communication data bus.
Figure 3B:
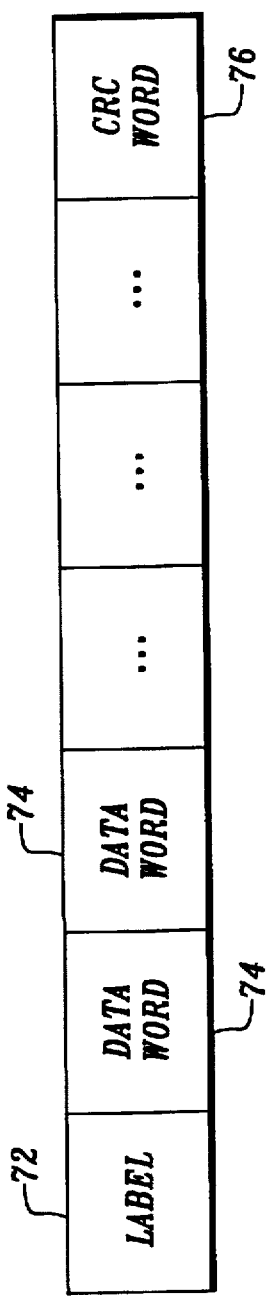

As illustrated in FIGS. 3A and 3B, the channels 40, 42 and 44 and the LRUs 30 send data, commands, etc. (collectively referred to herein as data) via the global communication network 34 in the form of messages 78. Hence, each channel 40, 42 and each LRU 30 may generally be referred to as a transmitter (TMR). Each message 78 comprises a plurality of 16-bit wordstrings 70. In one actual embodiment of the invention the wordstrings are 16-bit wordstings. Each wordstrig 70 comprises a label 72, a number of data words 74, and a cyclic redundancy check (CRC) word. The label 72 identifies the specific TMR sending the message 78; each data word 74 comprises 16 bits of data associated with the specific TMR; and the CRC word is used to indicate data corruption on the global communication bus 34. The lanes 46, 48 and 50 of each channel 40, 42 and 44 are synchronized so that each lane synchronously receives and processes each message 78 received. However, as more fully described below, each lane of each channel, and thus, each channel, makes its own determination from these messages 78 if a fault in the global communication bus 34, the LRUs 30 or 38 or the PFCs 40, 42 and 44 has occurred and if so, the cause of the fault.

Figure 4A:
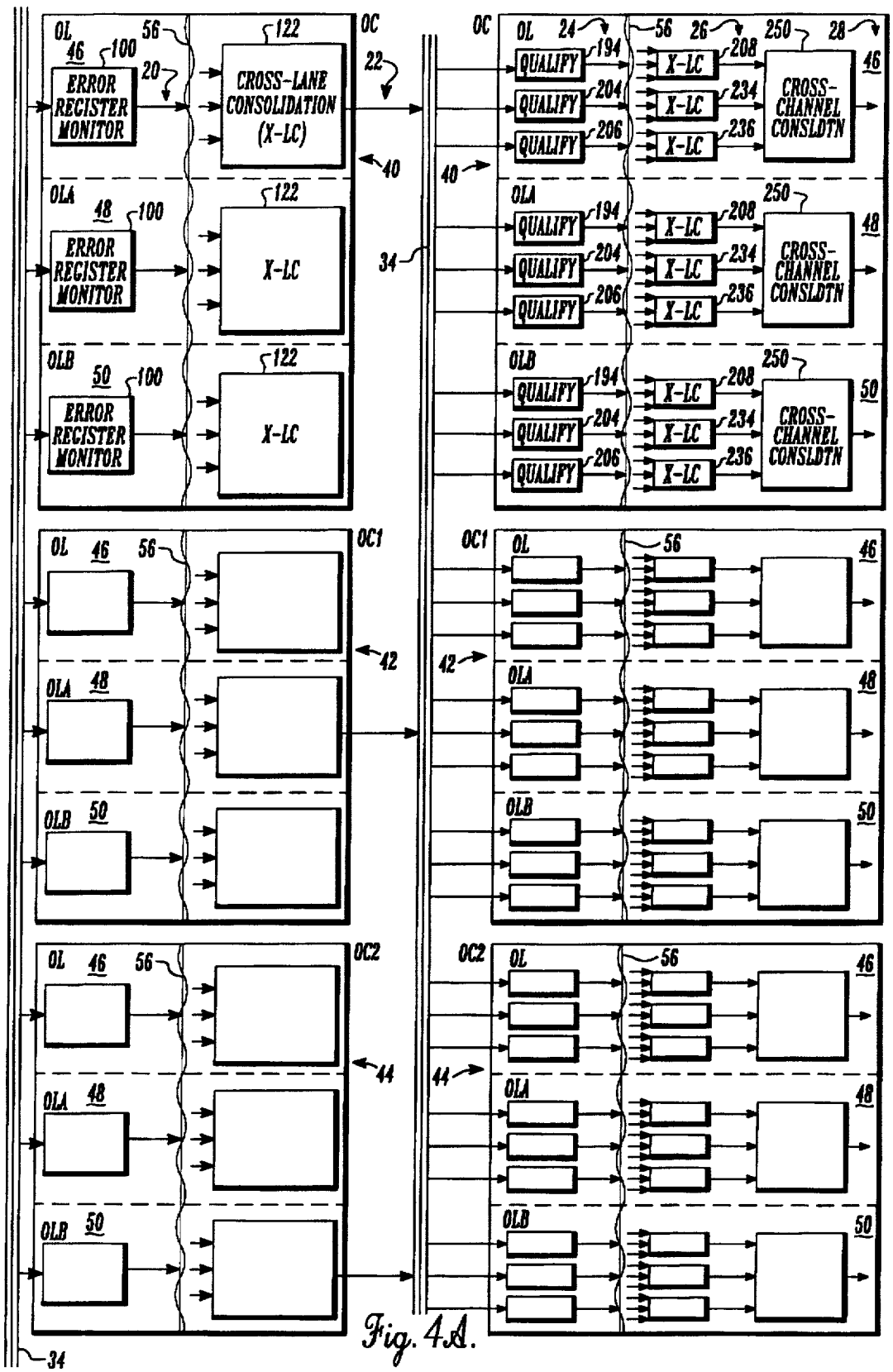
FIGS. 4A, 4B and 4C are functional block diagrams showing how a channel monitors and identifies faults in the fly-by-wire system in accordance with the present invention.
Figure 4B:
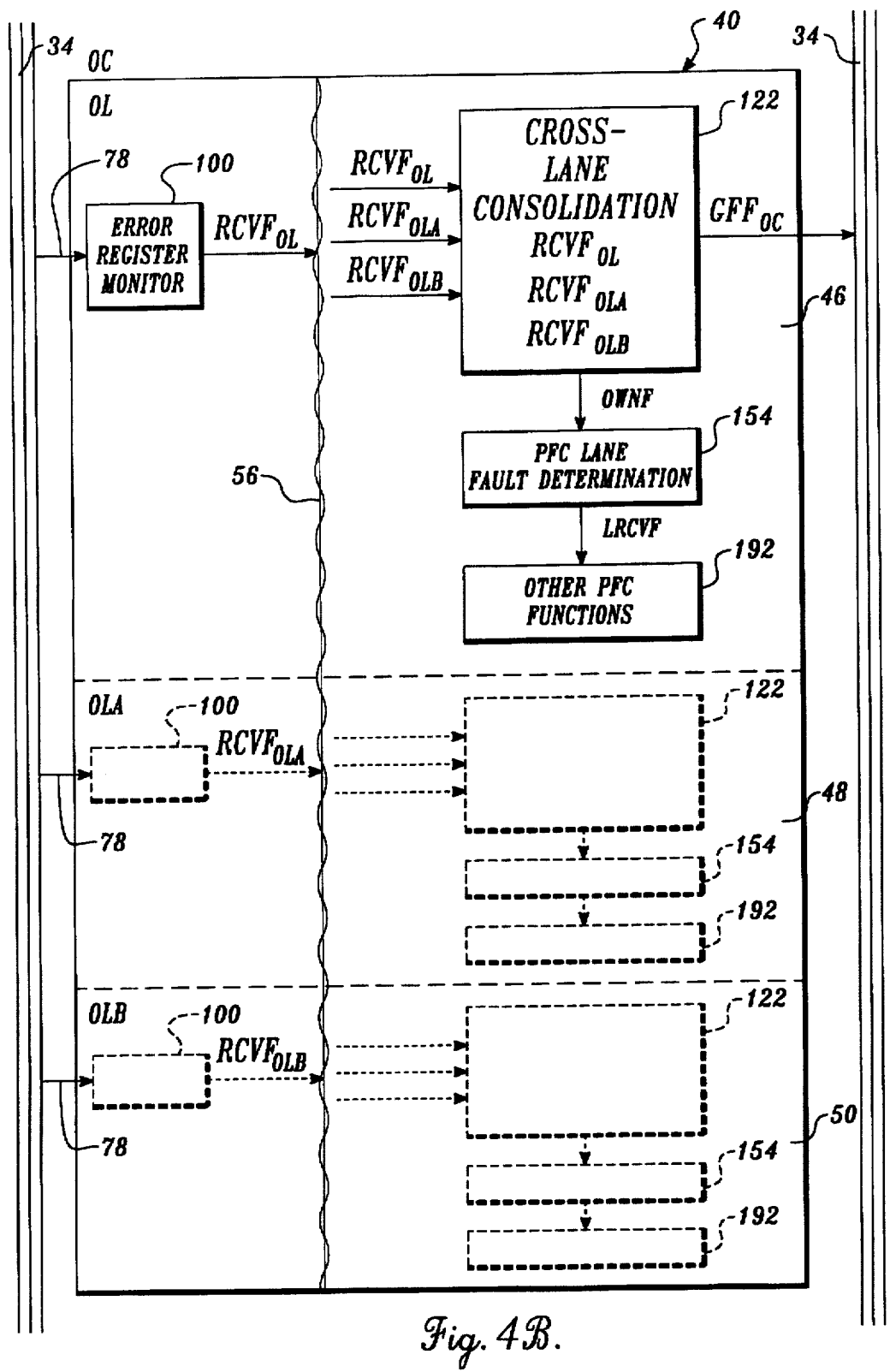
Figure 4C:
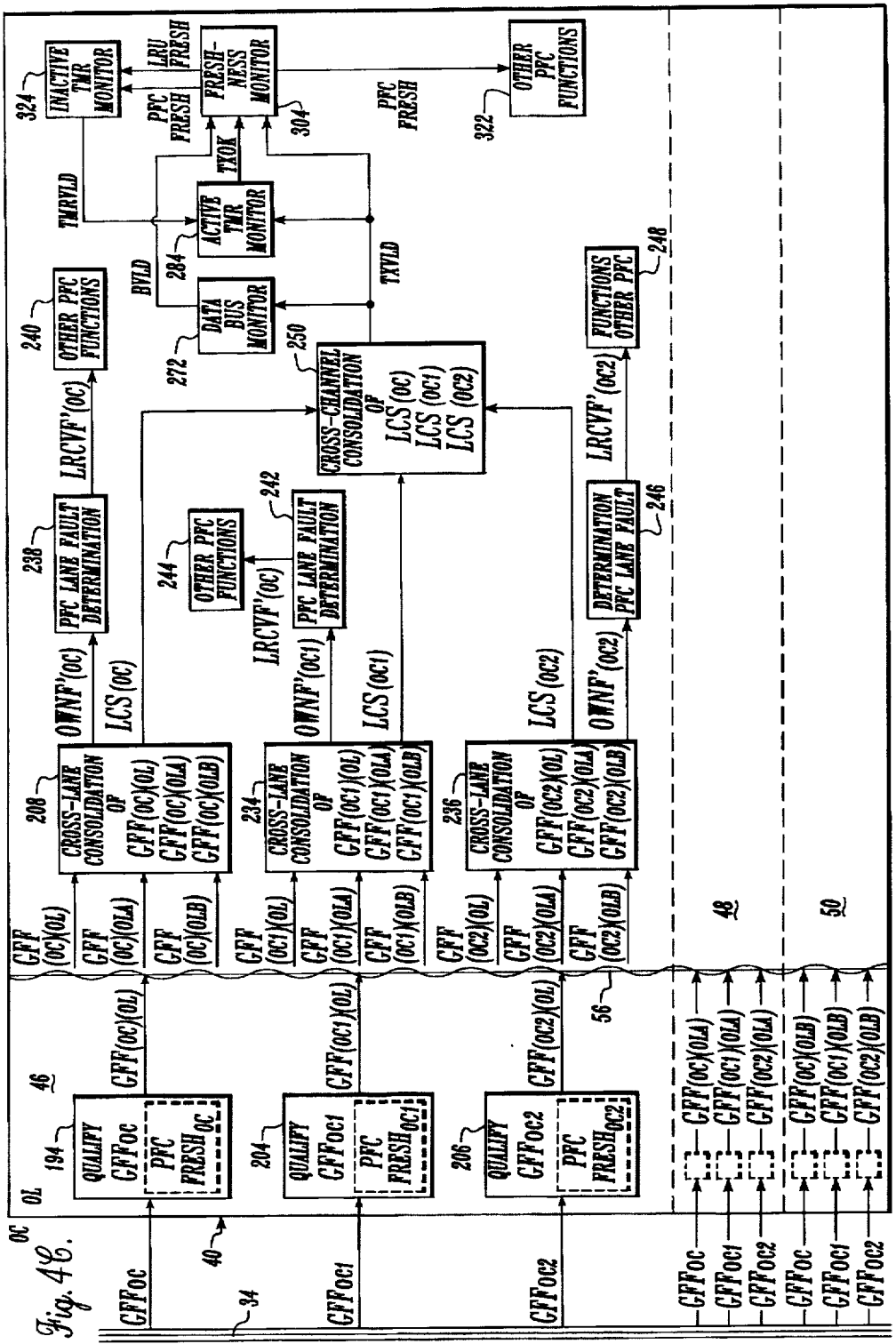

FIGS. 4A, 4B and 4C are functional block diagrams showing how the channels 40, 42 and 44 monitor and identify faults in the fly-by-wire system 31 in accordance with the present invention in order to obtain a high level of integrity and availability in the system. Because the functions performed by channels 40, 42 and 44 are virtually identical, only the functions as performed by one channel are described. In the following description, this channel is referred to as the "own channel" (OC) and has been arbitrarily selected for purposes of description to correspond to the left control channel 40 of the fly-by-wire system 40. Accordingly, the channels 42 and 44 are arbitrarily referred to as the "other channel 1" (OC1) and "other channel 2" (OC2), respectively. However, if one were to describe the functions as they were performed by channel 42, channel 44 would be referred to as the "other channel 1," while channel 40 would be referred to as the "other channel 2." Hence, one of ordinary skill in the art will understand from this description that the functions performed in the "own channel" are also performed in the "other channels" as well.

Referring now to FIG. 4A, the functions performed by the own channel to monitor and identify faults in the fly-by-wire system 31 are illustrated. It will be readily apparent to those of ordinary skill in the art that the functions described herein are synchronously performed by the MPU 54 of each lane 46, 48 and 50 of the own channel. As shown in FIG. 4A, the process begins in each channel 40, 42 and 44 with the error register monitoring function. Specifically, an error register monitor 100 monitors the messages 78 received by the channel via the global communication bus 34 from the LRUs 30 and 38 and the other channels 40, 42 and 44. For purposes of ease in illustration and discussion, the present inventions shall be described as applied to one message 78' sent by a specific TMR, whether a PFC or an LRU via the global communication bus 34. Those of ordinary skill in the art will recognize that each message 78 sent by each LRU 30 or 38 or channel 40, 42 or 44 in the fly-by-wire system 31 is processed in the same manner as message 78'.

As each lane 46, 48 and 50 receives the message 78' from the specific TMR via one of the data busses 33, 35 or 37, the error register monitor 100 of that lane generates a receive fault (RCVF) signal 20 that indicates whether the specific TMR is transmitting a message having excessive errors. Each lane of the own channel then sends its RCVF signal to the MPUs 54 of the other lanes via the private data bus 56 of the own channel. Since each lane of the channel synchronously processes the message 78' received via the global communication bus 34, the MPU 54 of each lane will be sending its RCVF signal to the other MPUs at approximately the same time. Hence, each lane 46, 48 and 50 of the own channel will receive three RCVF signals (generally designated by numeral 20).

At block 122, the MPU 54 of each lane 46, 48 and 50 performs a cross-lane consolidation of the three RCVF signals 20 to determine if a majority of the lanes suspect that the specific TMR is transmitting a message 78' having excessive errors. This determination is referred to as a lane majority opinion of the own channel and is generally designated in FIG. 4A with numeral 22. It will be appreciated that each lane of the own channel performs the cross-lane consolidation of the three receive fault signals 20 and thus, each lane determines a lane majority opinion 22. Command lane 46 of the own channel then transmits the lane majority opinion to the other channels via the global communication bus 34.

As noted above, other channel 1 and the other channel 2 also perform the functions just described. Hence, the command lanes 48 and 50 of other channel 1 and other channel 2, respectively, transmit their own lane majority opinions 22 to the own channel (and each other) via the global communication bus 34. Consequently, each lane 46, 48 and 50 of the own channel receives the lane majority opinion 22 of each channel 40, 42 and 44 via the global communication bus 34. The microprocessor 54 of each lane 46, 48 and 50 of the own channel then qualifies each received lane majority opinion 22 (blocks 194, 204 and 206) to ensure that each channel 40, 42 and 44 was functioning properly when its command lane transmitted its lane majority opinion 22. Hence, each lane generates a qualified lane majority opinion for each channel. The qualified lane majority opinion for each channel is generally designated by numeral 24 in FIG. 4A. The qualified majority opinion for each channel is transmitted by the MPU 54 of the lane via the private data bus 56 to the other lanes of the own channel.

As seen in FIG. 4A, each lane 46, 48 and 50 of the own channel receives the qualified lane majority opinions 24 generated by each lane. More specifically, each lane receives three sets of qualified lane majority opinions comprising: 1) the lane majority opinion of the own channel as qualified by each lane 46, 48 and 50; 2) the lane majority opinion of other channel 1 as qualified by each of the lanes 46, 48 and 50; and 3) the lane majority opinion of other channel 2 as qualified by each of the lanes 46, 48 and 50. The microprocessor 54 then performs a cross-lane consolidation of each set of qualified lane majority opinions (blocks 208, 234 and 236) to determine a final lane majority opinion (generally designated in FIG. 4A by numeral 26) for each channel 40, 42 and 44 indicating whether a majority of the lanes of the channel has determined that a fault has occurred in the specific TMR.

Finally, in block 250, each lane 46, 48 and 50 performs a cross-channel consolidation of the final lane majority opinions 26 to determine a channel majority opinion 28, which indicates if a majority of the channels have determined that the specific TMR has experienced a fault. In further embodiments of the present invention, the channel majority opinion is then processed by each lane to identify the type of fault the specific TMR is experiencing or to identify faults in other components of the fly-by-wire system 31.

Referring now to FIG. 4B, the determination of the lane majority opinion by one of the lanes of the own channel is shown. Because the functions performed by each lane 46, 48 and 50 of the channel are virtually identical and performed by each lane simultaneously, only the functions performed by one lane of the channel are described. In the following description, this lane is referred to as the "own lane" or "OL" and has been selected arbitrarily to correspond to lane 46 of the own channel. Accordingly, lanes 48 and 50 are arbitrarily referred to as the "other lane A" (OLA) and "other lane B" (OLB), respectively. However, if one were to describe the functions as performed by lane 48, lane 48 would be referred to as the "own lane," while lanes 50 and 46 would be referred to as the "other lane A" and "other lane B," respectively. Hence, one of ordinary skill in the art will understand from this description that as the functions depicted in FIG. 4B are being performed in the own lane, virtually the same functions are being performed simultaneously in other lane A and other lane B as well. For ease of illustration, the functions performed by other lane A and other lane B are represented in FIG. 4B by phantom lines.

As mentioned earlier, the LRUs 30 or 38 and PFCs 40, 42 and 44 of the fly-by-wire system 31 communicate with the channels 40, 42 and 44 by sending messages 78 over a specific data bus 33, 35 or 37 of the global communication bus 34. The messages are received by the interface 60 of each lane 46, 48 and 50 of each own channel. Referring specifically to the own lane of the own channel, for each wordstring 70 of the message 78' sent by the specific TMR in the fly-by-wire system, error information regarding the wordstring is stored in the error register 62, 63 or 64 of the interface 60 associated with the specific bus upon which the specific TMR is transmitting. The error register stores a word of predetermined bit length, e.g., 16-bit length, each bit representing a specific type of error that occurs when a wordstring is transmitted and corrupted on the global communication bus 34. Hence, if the wordstring 70 contains errors, corresponding bits in the associated error register will be set to one, otherwise the bits are set to zero. The error register monitoring function shown at block 100 in FIG. 4 uses the error information stored in the error registers 62, 63 and 64 to determine if the specific TMR being monitored is suspected of transmitting message 78' with an excessive amount of errors. The logic employed by the present invention to make this determination is shown in more detail in FIG. 5.

Figure 5:
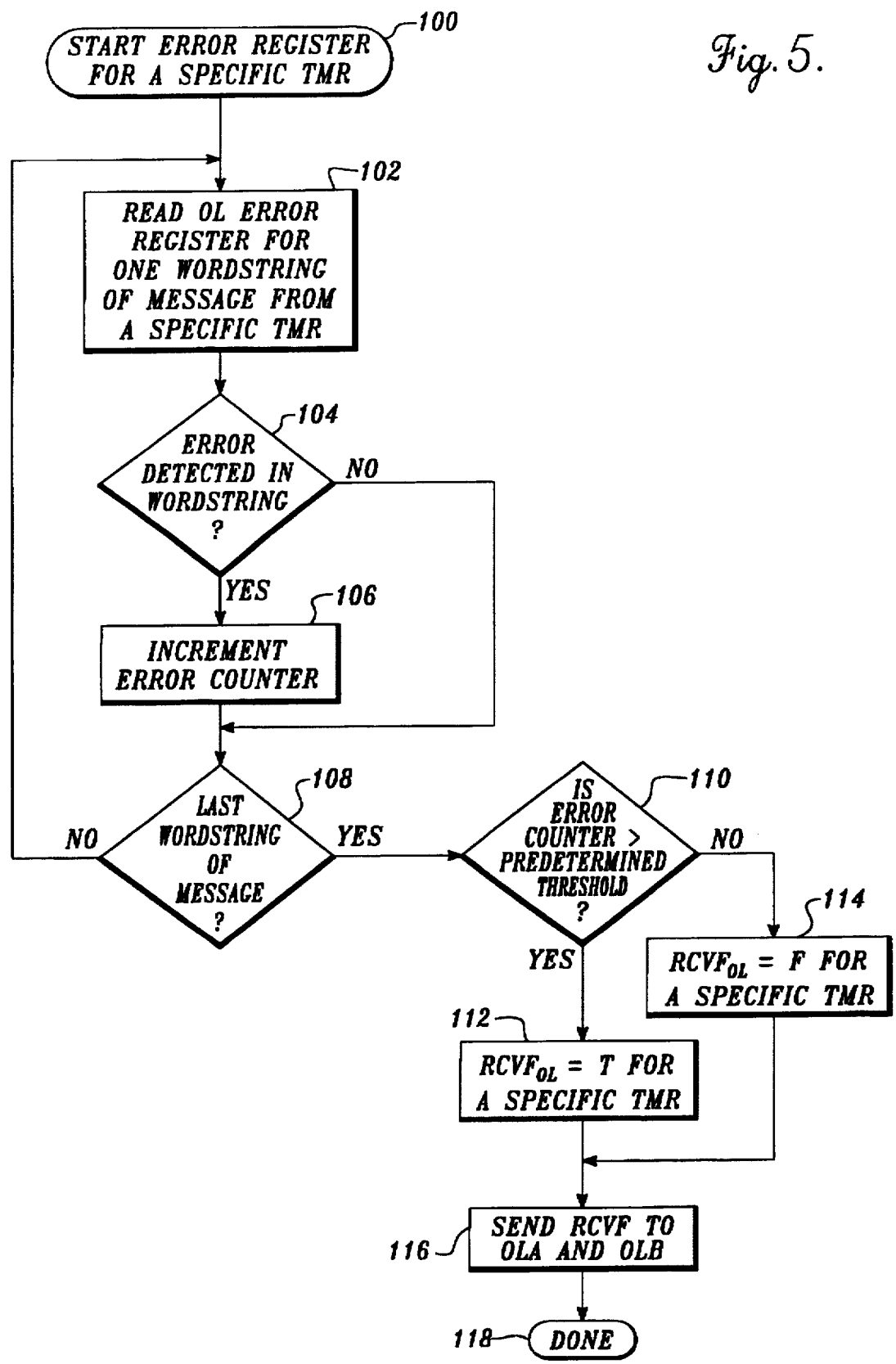
FIG. 5 is a flowchart showing the logic used by each lane of a channel to determine if the lane suspects that an LRU is experiencing a fault.

The logic begins in FIG. 5 at block 102 where the MPU 54 of the own lane reads the error registers 62, 63 or 64 associated with the data bus 33, 35 or 37 upon which the specific TMR is transmitting to obtain the error information associated with one wordstring 70 of the message 78' sent from the specific TMR which has been identified in the label 72 of the wordstring 70. In decision block 104, the logic determines if an error was detected in the wordstring. In other words, the logic determines if the error register bits associated with that wordstring have been set to one. If the result is positive, the logic proceeds to block 106 where an error counter used to keep track the number of errors in a message is incremented. However, if the result of decision block 104 is negative, the error counter is not incremented and the logic proceeds directly to decision block 108. In decision block 108, the logic determines if the error information for the last wordstring 70 of the message 78' has been read from the appropriate error register, i.e., if the error information of all wordstrings 70 in message 78' sent by the specific TMR have been processed. If not, the logic returns to block 102 where the error information associated with the next wordstring is read from the appropriate error register. The logic then repeats blocks 104 through 108 until the entire message has been processed.

If the result of decision block 108 is positive, i.e., if the error information for the last wordstring of the message has been read, the logic proceeds to decision block 110. In decision block 110, the logic determines if the error counter has exceeded a first predetermined threshold equivalent to an expected maximum number of errors allowed in a given time period. It will be appreciated by those of ordinary skill in the art that the first predetermined threshold is established as a function of various fly-by-wire system parameters, including the stringent safety requirement that the numerical probability of a system failure be limited to less than 1.0E–10 per flight hour. Hence, the first predetermined threshold can be varied in accordance with fly-by-wire system parameters in order to achieve the desired level of integrity.

If the result of decision block 110 is positive, the logic proceeds to block 112 where a receive fault signal for the own lane ($RCVF_{OL}$) is set to true indicating that the own lane suspects that the specific TMR is transmitting erroneous wordstrings at an excessive error rate. In other words, the own lane suspects that the specific TMR is experiencing a fault of some type. However, if the result of decision block 110 is negative, the logic proceeds to block 114 where $RCVF_{OL}$ is set to false indicating that the own lane does not suspect a fault in the specific TMR. It will be appreciated that $RCVF_{OL}$ is associated with the specific TMR being monitored by the error register monitor and thus $RCVF_{OL}$ is also associated with the specific data bus 33, 35 or 37 upon which the specific TMR is transmitting. In block 116, $RCVF_{OL}$ is stored in memory of the MPU 54 in the own lane and is sent to the other lanes of the own channel so that each lane 46, 48 and 50 may determine for itself if a majority of the lanes of the own channel suspect that the specific TMR is transmitting erroneous wordstrings at an excessive rate.

Returning now to FIG. 4B, one of ordinary skill in the art will appreciate that using the logic illustrated in FIG. 5, other lane A and other lane B of the own channel have generated their own RCVF signals, i.e., $RCVF_{OLA}$ and $RCVF_{OLB}$, and sent them to the own lane of the own channel via the private data bus 56. Correspondingly, the own lane receives $RCVF_{OLA}$ and $RCVF_{OLB}$ from other lane A and other lane B, respectively, and retrieves $RCVF_{OL}$ signal from its MPU's memory. In block 122, the MPU 54 of the own lane performs the cross-lane consolidation of the three RCVF signals generated by the lanes 46, 48 and 50 of the own channel to form a lane majority opinion for the own channel indicating whether a majority of the lanes of the own channel suspect that the specific TMR is transmitting erroneous wordstrings at an excessive rate, i.e., that the specific TMR is experiencing a fault.

Figure 6:
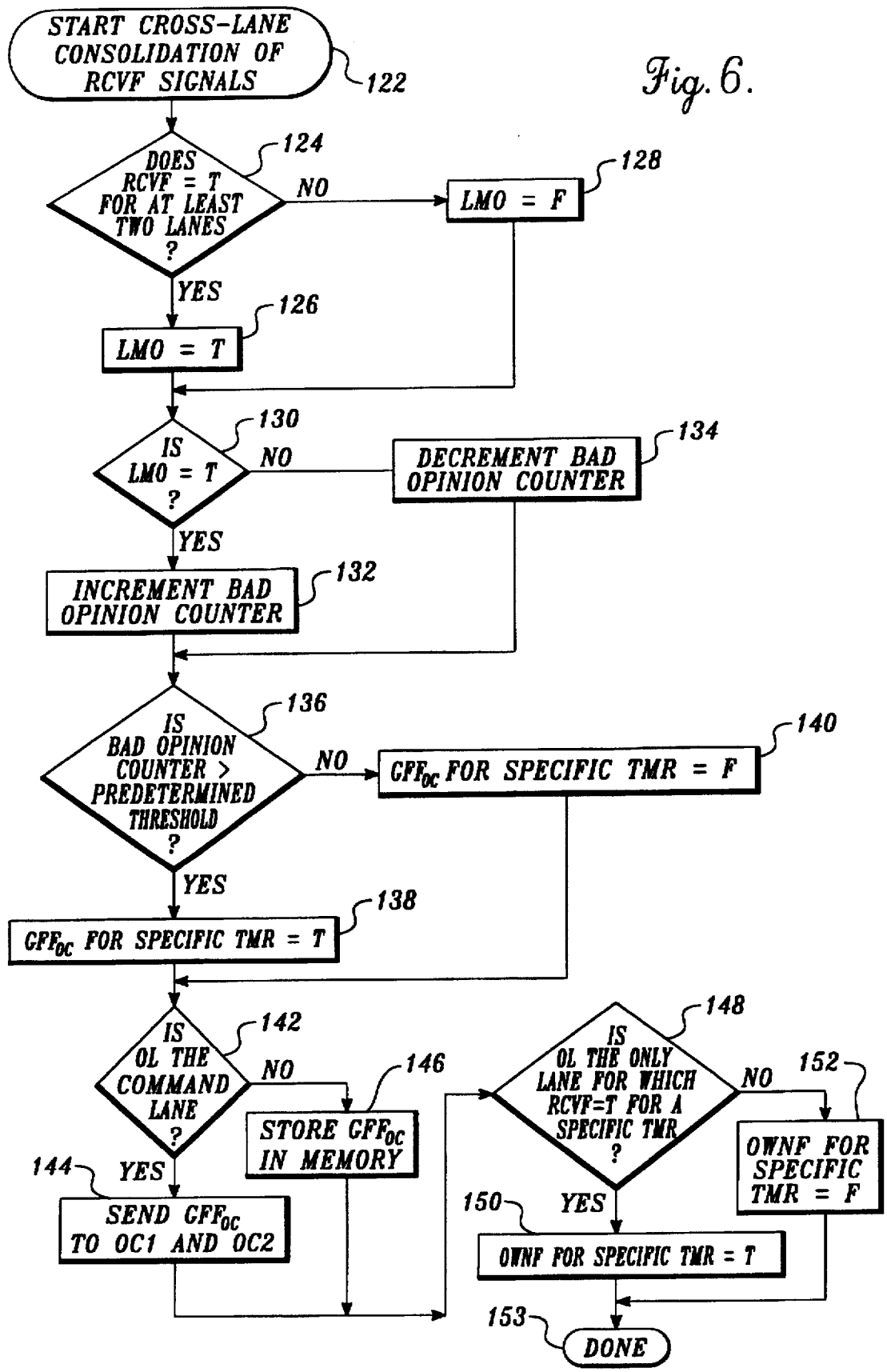
FIG. 6 is a flowchart illustrating the logic used to determine if a majority of the lanes of a channel suspect that an LRU is experiencing a fault.

The logic employed by the MPU 54 of the own lane to perform the cross-lane consolidation of RCVF signals is shown in more detail in FIG. 6. The logic begins in decision block 124 where it determines if RCVF has been set to true for at least two lanes in the own channel. If the result is positive, the logic proceeds to block 126 where a lane majority opinion (LMO) is set to true indicating that at least two lanes of the channel suspect that the specific TMR is transmitting erroneous wordstrings at an excessive rate. In other words, at least two lanes of the channel suspect a fault in the specific TMR and thus, have a "bad opinion" of the specific TMR. However, if the result of decision block 124 is negative, at least two lanes have determined that the specific TMR is not experiencing a fault. Thus, LMO is set to false and the logic proceeds to decision block 130. In decision block 130, the logic determines if LMO has been set to true. If so, the logic proceeds to block 132 where a bad opinion counter is incremented. The bad opinion counter monitors the number of times at least two lanes of the own channel have a bad opinion of the specific TMR. However, if the result of block 130 is negative, the bad opinion counter is decremented and the logic proceeds to decision block 136.

In decision block 136, the logic determines if the bad opinion counter has exceeded a second predetermined threshold. The second predetermined threshold is equivalent to an expected maximum number of times a majority of lanes can have a bad opinion of the specific TMR. In the preferred embodiment, the second predetermined threshold is also determined as a function of various fly-by-wire system parameters, including the stringent safety requirements set forth above. Thus, the level of integrity in the system is further improved. If the result of decision block 136 is positive, the logic proceeds to block 138 where a confirmed lane majority opinion (also referred to as a gray fault flag for the own channel $GFF_{OC}$) is set to true indicating that at least two lanes of the own channel have persistently suspected that the specific TMR is transmitting erroneous wordstrings at an excessive rate. In other words, a fault of some type in the fly-by-wire system 31 is confirmed by the persistent bad opinion of a majority of lanes of the own channel. If the result of decision block 136 is negative, however, the logic proceeds to block 140 where $GFF_{OC}$ is set to false indicating that a majority of the lanes in the own channel have determined that a fault in the specific TMR has not occurred because a majority of the lanes did not persistently suspect a fault. Since the possible error conditions that caused the own lane to suspect a fault did not persist, nuisance condemnation of the specific TMR is avoided. Thus, the availability of that specific TMR is maintained in the fly-by-wire system 31. Further, it will be apparent to one of ordinary skill in the art that the persistence requirement for "bad opinions" also accommodates for the asynchronous operation of the three channels. Finally, one of ordinary skill in the art will recognize that if one lane is momentarily in disagreement with the other two, that lane will eventually follow the majority opinion.

Once the confirmed lane majority opinion for the own channel, $GFF_{OC}$, is determined, it must be sent to the other channel 1 and the other channel 2 of the fly-by-wire system 31 for use in other functions. Hence, the logic proceeds to decision block 142 where the logic determines if the own lane is the command lane of the channel. If so, the logic proceeds to block 144 where the MPU 54 of the own lane sends $GFF_{OC}$ to the other lane A, the other lane B, other channel 1 and other channel 2 of the fly-by-wire system 31 via the global communication bus 34. If the own lane is not the command lane, the logic proceeds to block 146 where the MPU 54 of the own lane simply stores $GFF_{OC}$ in memory for other use. Since the other lane A and the other lane B are performing this function simultaneously, it will be appreciated that while the command lane of the own channel (either other lane A or other lane B) transmits $GFF_{OC}$ to the other channels in block 144.

While $GFF_{OC}$ is sent to by the command lane of the own channel, the own lane must determine if it is alone in having a bad opinion of the specific TMR. If so, it is possible that the own lane is experiencing a fault, rather than the specific TMR it is accusing. Consequently, in decision block 148, the logic determines if the own lane is the only lane for which RCVF has been set to true for the specific TMR, i.e., that $RCVF_{OL}$ has been set to true and $RCVF_{OLA}$ and $RCVF_{OLB}$ have been set to false. If the result is positive, the logic proceeds to block 150 where an own lane receive fault signal (OWNF) for the specific TMR is set to true indicating that the own lane may possibly be experiencing a fault. However, if the result of decision block 148 is negative, the own lane is not experiencing a fault and OWNF is set to false in block 152. As mentioned above, $RCVF_{OL}$ is associated with the specific TMR and the specific data bus 33, 35 or 37 upon which that specific TMR is transmitting. Thus, it will be apparent to one of ordinary skill in the art that OWNF is associated with the specific TMR and the specific data bus 33, 35 or 37 upon which the specific TMR is transmitting as well. As described next, OWNF is used by the own lane to perform a PFC lane fault determination confirming that the own lane of the own channel is experiencing a fault.

Referring to FIG. 4B, the MPU 54 of the own lane performs a PFC lane fault determination in block 154 to determine if the own lane is experiencing a fault. The logic employed by the MPU 54 to perform the PFC lane fault determination is shown in more detail in FIG. 7. If the own lane is alone in suspecting a fault in three or more TMRs transmitting on a specific data bus 33, 35 or 37, the own lane is most likely experiencing a fault. Accordingly, beginning in decision block 156, the logic determines if the own lane has suspected at least three TMRs transmitting on the left bus 33 of having a fault while the other lanes have not suspected the same faults, i.e., if OWNF has been set to true with respect to three or more TMRs transmitting on the left data bus 33. If so, a left bus fault discrete (LBF) is set to true in block 158 indicating that the own lane is alone in suspecting at least three TMRs on the left bus of having a fault. If the result of decision block 156 is negative, LBF is set to false in block 160 indicating that the own lane is not alone in suspecting that at least three TMRs on the left bus have a fault.

The logic then proceeds to decision block 162 where it determines if the own lane is alone in suspecting at least three TMRs on the center bus 35 of having a fault while the other lanes have not suspected the same faults. If so, in block 164 the center bus fault discrete (CBF) is set to true. If not, in block 166, CBF is set to false. Similarly, the logic proceeds to decision block 168 where it determines if the own lane is alone in suspecting at least three TMMRs on the right bus 37 of having a fault while the other lanes have not suspected the same faults. If so, in block 170 a right bus fault discrete (RBF) is set equal to true. If not, in block 172 RBF discrete is set to false.

After LBF, CBF and RBF have been set, the logic proceeds to block 174 where it determines if any one of LBF, CBF or RBF has been set to true. In other words, the logic determines if the own lane is the only lane in the channel accusing at least three TMRs transmitting on a specific bus 33, 35 or 37 of a fault. If so, an own lane fault discrete (OLF) is set to true in block 176 confirming the likelihood of a fault in the own lane. If the result of decision block 174 is negative, OLF is set to false in block 178. In decision block 180, the logic determines if OLF has been set to true and if so, a fault counter is incremented in block 182. The fault counter keeps track of the number of times the own lane has been alone in accusing three or more TMRs on a specific data bus of a fault. If OLF is false, however, the own lane is not the only lane making such an accusation and thus, the fault counter is decremented in block 184. In decision block 186, the logic determines if the fault counter has exceeded a third predetermined threshold equivalent to a maximum number of times the own lane may accuse three or more TMRs on a specific bus of a fault. As described above in connection with the second predetermined threshold, the third predetermined threshold is established as a function of various system parameters so that a high level of integrity in the fly-by-wire system is obtained.

If the result of decision block 186 is positive, the own lane is alone in persistently accusing three or more TMRs on a specific data bus of having a fault and thus, the own lane is most likely experiencing a fault. Such persistent disagreement by the own lane must be dealt with before another lane of the own channel experiences a fault and joins the own lane to produce an incorrect confirmed lane majority opinion for the own channel. Consequently, in block 188 a lane receive fault signal (LRCVF) is set to true indicating that the own lane is experiencing a fault. As shown in FIG. 4B, LRCVF is then used by other PFC functions in block 192 such as the PFC lane redundancy management function (not the subject of this invention, and thus, not shown) which uses LRCVF to inhibit and restart the own lane as necessary, and prevent the own lane from forming an erroneous confirmed lane majority opinion $GFF_{OC}$. However, if the result of decision block 186 is negative, the own lane is probably not experiencing a fault and LRCVF is set to false in block 190, once again avoiding nuisance condemnation of an aircraft component and promoting system availability.

Figure 8:
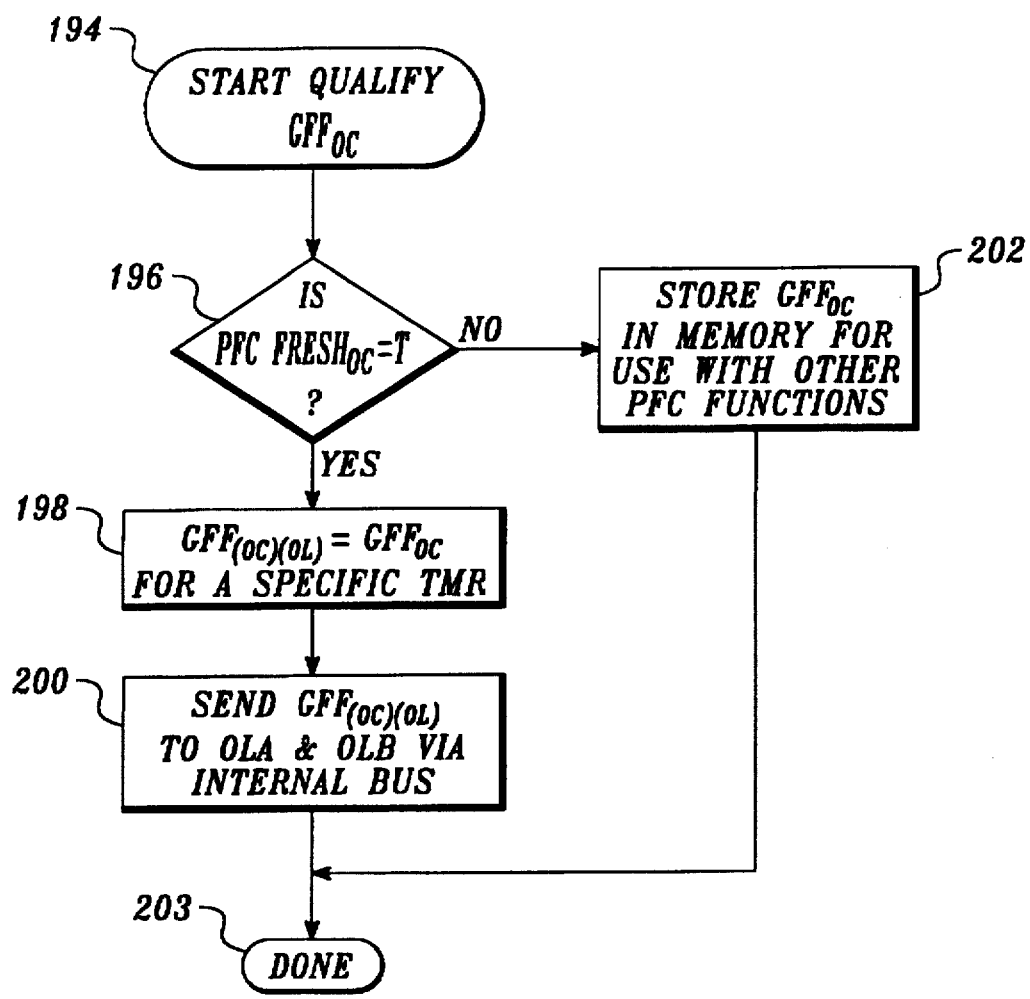
FIG. 8 is a flowchart showing the steps used to qualify the determination made in FIG. 7.

Referring now to FIGS. 4A and 4C, it is apparent that lanes 48 and 50 generate and transmit their own confirmed lane majority opinions $GFF_{OC1}$, and $GFF_{OC2}$ as described above in connection with the own lane. Hence, each lane 46, 48 and 50 of the own channel receives $GFF_{OC}$ from its own channel, $GFF_{OC1}$, from other channel 1 and $GFF_{OC2}$ from other channel 2 via the global communication bus 34. The next function to be performed by the own lane of the own channel is to qualify each of the received GFF signals in order to ensure that the channel, i.e., the PFC which sends the specific GFF is not experiencing a fault. Thus, the MPU 54 qualifies $GFF_{OC}$, $GFF_{OC1}$ and $GFF_{OC2}$ as shown in blocks 194, 204 and 206. The logic employed by the MPU 54 in qualifying $GFF_{OC}$ is shown in FIG. 8. Those of ordinary skill in the art will appreciate that virtually the same logic is employed by the MPU 54 of the own lane in blocks 204 and 206 to qualify both $GFF_{OC1}$ and $GFF_{OC2}$. Thus, the logic employed in blocks 204 and 206 will not be discussed in detail.

Referring to FIG. 8, the logic begins in decision block 196, where a test is unable to determine if a signal referred to as $PFC\ FRESH_{OC}$ associated with the own channel has been set to true. As discussed in more detail below, PFC $FRESH_{OC}$ indicates whether the own channel is still actively transmitting messages 78 to the other channel 1 and the other channel 2. If so, the own channel is still active and processing of $GFF_{OC}$ may continue. Consequently, the logic will proceed to block 198 where the MPU 54 of the own lane sets a qualified lane majority opinion ($GFF_{(OC)(OL)}$) equal to the confirmed (but, but previously unqualified) lane majority opinion $GFF_{OC}$. In block 200, the MPU 54 of the own lane sends $GFF_{(OC)(OL)}$ to other lane A and other lane B of the own channel via the private data bus 56.

If the result of decision block 196 is negative, i.e., if PFC $FRESH_{OC}$ is false, the own channel is not actively transmitting messages 78 to the other channels. Thus, the own channel is most likely experiencing a fault or failure. Consequently, the logic proceeds to block 202 where the unqualified and now unusable $GFF_{OC}$ signal is stored in memory of the MPU 54 so that it can be used by other PFC functions to shutdown the own channel if necessary.

After $GFF_{OC}$, $GFF_{OC1}$ and $GFF_{OC2}$ are qualified by the own lane in blocks 194, 204 and 206, the qualified lane majority opinions, $GFF_{(OC)(OL)}$, $GFF_{(OC1)(OL)}$ and $GFF_{(OC2)(OL)}$, for each channel are sent to the other lanes of the own channel via the private data bus 56. As shown in phantom lines in FIG. 4C, the other lane A and the other lane B also qualify $GFF_{OC}$, $GFF_{OC1}$ and $GFF_{OC2}$ in blocks 194, 204 and 206. Hence, other lane A transmits qualified lane majority opinions $GFF_{(OC)(OLA)}$, $GFF_{(OC1)(OLA)}$ and $GFF_{(OC2)(OLA)}$ and other lane B transmits qualified lane majority opinions $GFF_{(OC)(OLB)}$, $GFF_{(OC1)(OLB)}$ and $GFF_{(OC2)(OLB)}$ to the own lane via the private data bus 56. As a result, each lane 46, 48 and 50 of the own channel receives a set of qualified lane majority opinions for each channel. For example, the own lane receives the first set comprising $GFF_{(OC)(OL)}$, $GFF_{(OC)(OLA)}$ and $GFF_{(OC1)(OLB)}$; the second set comprising GFF $_{(OC1)(OL)}$, $GFF_{(OC1)(OLA)}$ and $GFF_{(OC1)(OLB)}$; and the third set comprising $GFF_{(OC2)(OL)}$, $GFF_{(OC2)(OLA)}$ and $GFF_{(OC2)(OLB)}$.

Figure 9:
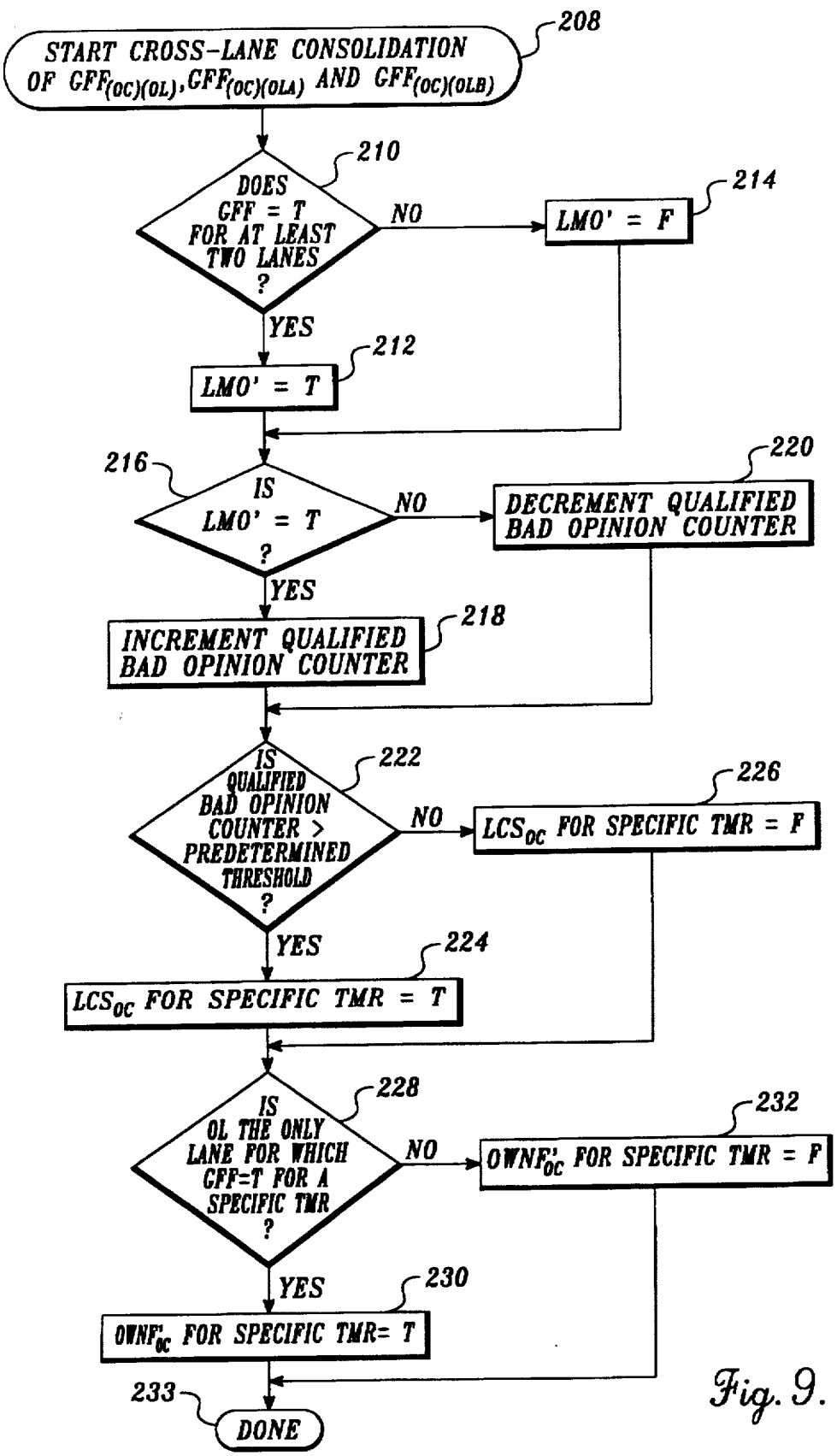
FIG. 9 is a flowchart illustrating the steps used to determine if a majority of the lanes of a channel still suspect that an LRU is experiencing a fault after qualification.

Next, the MPU 54 of the own lane performs a cross-lane consolidation of the qualified lane majority opinions for each channel to determine a final lane majority opinion for each channel 40, 42 and 44 of the fly-by-wire system 31. More specifically, in block 208 a cross-lane consolidation is performed on the first set of qualified lane majority opinions for the own channel. Likewise, in block 234 a cross-lane consolidation is performed on the second set of qualified lane majority opinions for the other channel 1, while in block 236 a cross-lane consolidation is performed on the third set of qualified lane majority opinions for other channel 2. The logic employed by the MPU 54 of the own lane in performing the cross-lane consolidation of the first set of qualified lane majority opinions for the own channel is shown in more detail in FIG. 9. However, it will be readily apparent to those of ordinary skill in the art that virtually the same logic is employed by the MPU 54 of the own lane to perform the cross-lane consolidation of the second and third sets of qualified lane majority opinions, i.e., the qualified majority lane opinions of both other channel 1 and other channel 2. Thus, the logic employed in blocks 234 and 236 will not be discussed in detail.

As shown in FIG. 5, the block 208 logic begins in decision block 210 where a test is made to determine if the qualified lane majority opinion of at least two lanes in the own channel has been set to true, i.e., at least two of the three qualified majority opinions $GFF_{(OC)(OL)}$, $GFF_{(OC)(OLA)}$ and $GFF_{(OC)(OLB)}$ are true. If the result is positive, the logic proceeds to block 212 where a transitory lane majority opinion signal (LMO') is set to true indicating that even after qualification, at least two lanes of the channel still suspect that the specific TMR is transmitting erroneous wordstrings at an excessive rate. In other words, at least two lanes of the channel now have a "qualified bad opinion" of the specific TMR. However, if the result of decision block 210 is negative, LMO' is set to false in block 214 indicating that after qualification of the GFF signals, the majority of the lanes of the own channel no longer suspect the specific TMR of a fault. In decision block 216, the logic determines if LMO' has been set to true. If so, a qualified bad opinion counter is incremented in block 218. The qualified bad opinion counter is used to determine if a majority of lanes in the own channel have persistently had a qualified bad opinion of the specific TMR so that nuisance condemnation of the specific TMR is avoided and system availability is maintained. However, if the result of decision block 216 is negative, the qualified bad opinion counter is decremented in block 220 because the majority of the lanes do not suspect the specific TMR of having a fault.

In decision block 222, the logic determines if the qualified bad opinion counter has exceeded a third predetermined threshold that is equivalent to a maximum number of times a majority of lanes in the own channel can have a qualified bad opinion of the specific TMR. In the preferred embodiment, the predetermined threshold is also determined as a function of various fly-by-wire system parameters, including the stringent safety requirement set forth above. Thus, the level of integrity in the multi-channel system is once again improved to a higher level. If the result of decision block 222 is positive, a final lane majority opinion (also referred to as a lane consolidation signal $LCS_{OC}$) is set to true indicating that at least two lanes of the own channel have persistently determined that the specific TMR is transmitting erroneous wordstrings 70 at an excessive rate even after qualification of the GFF signals. In other words, the final lane majority opinion of the own channel is that the specific TMR is experiencing a fault. However, if the result of decision block 222 is negative, the logic proceeds to block 226 where $LCS_{OC}$ is set to false indicating that a majority of the lanes in the own channel have determined that the specific TMR is not experiencing a fault. In either case, those of ordinary skill in the art will recognize that the third lane of the own channel not sharing in the majority opinion is anticipated to follow the final majority opinion of the own channel. Again, those of ordinary skill in the art will recognize that nuisance condemnation has been avoided and system availability maintained.

Before $LCS_{OC}$ can be used for any other purpose, the own lane must determine if it is alone in accusing the specific TMR. Consequently, after $LCS_{OC}$ has been set to true or false, the logic proceeds to decision block 228 where it determines if the own lane is the only lane of the channel for which the qualified lane majority opinion has been set to true for the specific TMR, i.e., if $GFF_{(OC)(OL)}$ has been set to true but $GFF_{(OC)(OLA)}$ and $GFF_{(OC)(OLB)}$ have been set to false. If the result is positive, the logic proceeds to block 230 where a qualified own lane receive fault ($OWNF_{OC}$) is set to true. However, if the result of decision block 230 is negative, $OWNF_{OC}$ is set to false. As shown in FIG. 4C, $OWNF_{OC}$ is used by the PFC lane fault determination in block 238 to determine if the own lane of the channel is experiencing a fault or failure.

Figure 7:
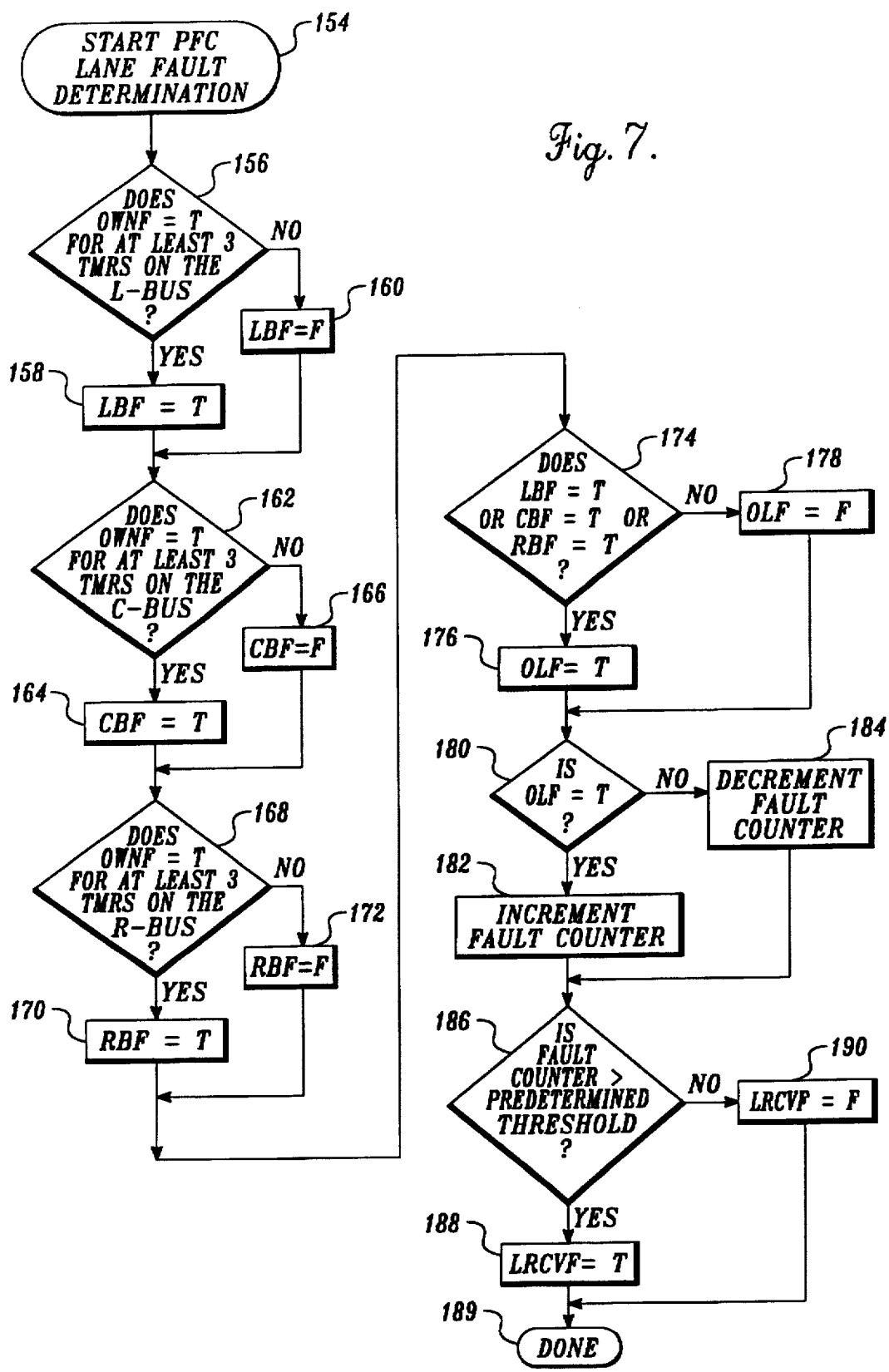
FIG. 7 is a flowchart illustrating the steps used to determine if only one lane of the channel suspects that an LRU is experiencing a fault.

The logic used to perform the PFC lane fault determination in block 238 is virtually the same as the logic used to perform the PFC lane fault determination in block 154 and shown in detail in FIG. 7. Hence, the logic used to perform the PFC lane fault determination using $OWNF_{OC}$ will not be described in detail. As sown in FIG. 4C, if the own lane is experiencing a fault, a qualified lane receive fault signal ($LRCVF_{OC}$) is set to true. Otherwise, $LRCVF_{OC}$ is set to false because the own lane is not experiencing a fault. $LRCVF_{OC}$ is then used by other PFC functions in block 240 such as the PFC lane redundancy management function (not shown and not the subject of this invention) to inhibit and restart the own lane as necessary.

As will be appreciated from the foregoing description, the cross-lane consolidation in of the qualified lane majority opinions of other channel 1 (block 234) produces a final lane majority opinion for the other channel 1 ($LCS_{OC1}$) and a qualified own lane receive fault ($OWNF_{OC1}$) using the virtually the same logic described above. Similarly, in block 236 the cross-lane consolidation of $GFF_{(OC2)(OL)}$, $GFF_{(OC2)(OLA)}$ and $GFF_{(OC2)(OLB)}$ that occurs in block 236 produces a final lane majority opinion ($LCS_{OC2}$) for the other channel 2 and a qualified own lane receive fault ($OWNF_{OC2}$). $OWNF_{OC1}$ and $OWNF_{OC2}$ are then processed further in blocks 242 and 244 and in blocks 246 and 248 as shown. Once the final lane majority opinions have been determined by the MPU 54 of the own lane for each channel 40, 42 and 44, a cross-channel consolidation of the final lane majority opinions is performed in block 250 to determine a channel majority opinion indicating if a majority of the channels have detected a fault in the specific TMR.

Figure 10:
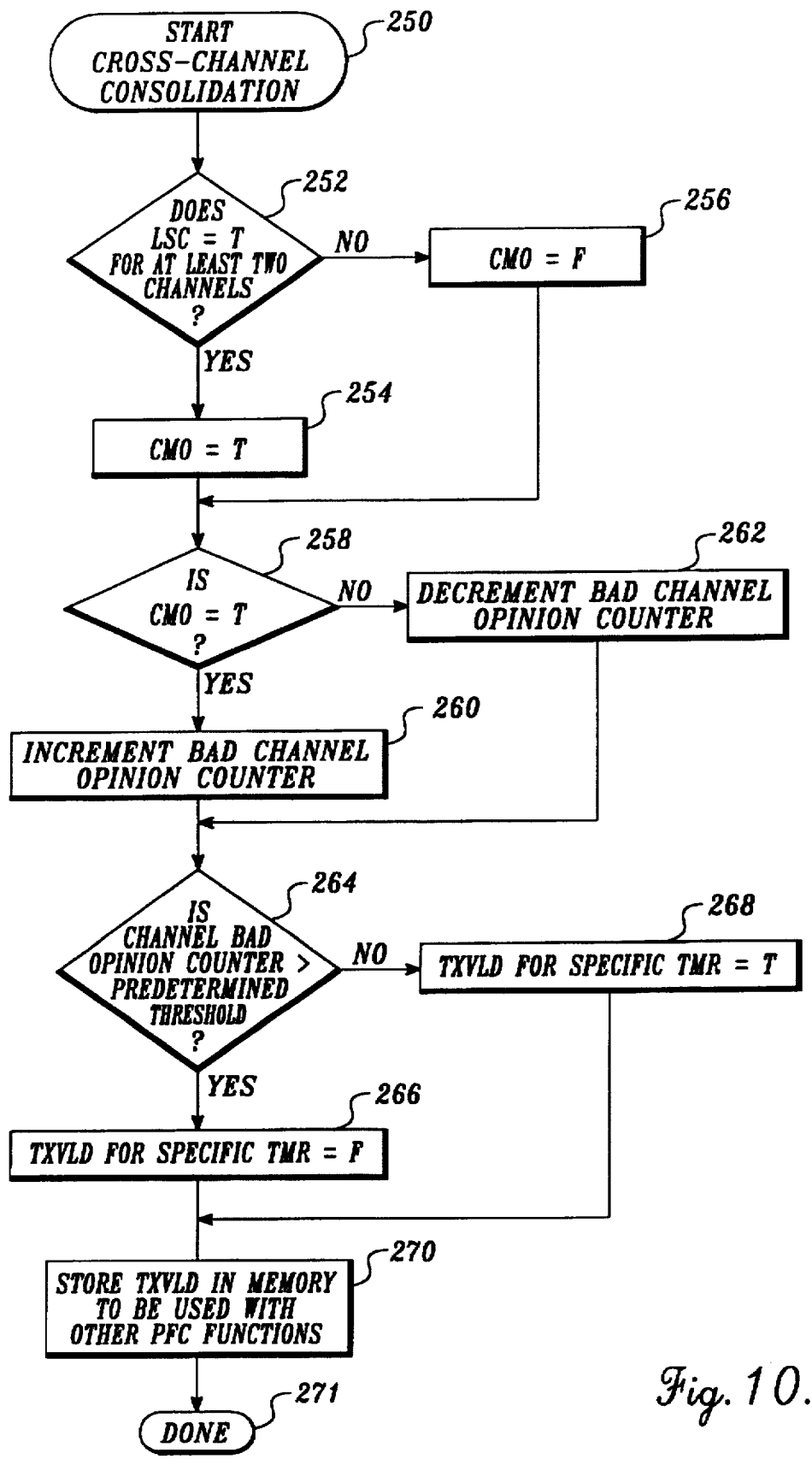
FIG. 10 is a flowchart illustrating the steps used to determine if a majority of the channels have determined that an LRU has experienced a fault.

The logic employed in block 250 to perform a cross-channel consolidation of $LCS_{OC}$, $LCS_{OC1}$, and $LCS_{OC2}$ is shown in FIG. 10. The logic begins in decision block 252 where it determines if the final lane majority opinion associated with the specific TMR has been set to true for at least two channels in the fly-by-wire system 31. In other words, the logic determines if at least two channels have a bad channel opinion of the specific TMR. If the result of decision block 252 is positive, a channel majority opinion (CMO) is set to true indicating that at least two channels of the fly-by-wire-system 31 have determined that the specific TMR is experiencing a fault of some type. However, if the result of decision block 252 is negative, CMO is set to false in block 256 indicating that the majority of the channels have determined the specific TMR does not have a fault. In decision block 258, the logic determines if CMO has been set to true. If so, a bad channel opinion counter is incremented. See block 260. The bad channel opinion counter monitors how persistently a majority of the channels have formed a bad channel opinion of the specific TMR so that nuisance condemnation is avoided and system availability is promoted. However, if the result of decision block 258 is negative, the bad channel opinion counter is decremented because a fault in the specific TMR is not suspected. See block 262.

Referring to decision block 264, the logic determines if the bad channel opinion counter has exceeded a fourth predetermined threshold that is the equivalent of a maximum number of times a majority of channels can have a bad channel opinion of the specific TMR. The fourth predetermined threshold is also determined as a function of various fly-by-wire-system parameters including the stringent safety requirement set for above so that level integrity of the system is further improved. If the result of decision block 264 is positive, then in block 266 an TMR valid signal (TXVLD) is set to false indicating that a majority of the channels of the fly-by-wire-system 31 have persistently had a bad opinion of the specific TMR. In other words, a fault of some type in the specific TMR is confirmed by a majority of the channels. If the result of decision block 264 is negative, however, TXVLD is set to true in block 268 indicating that a majority of the channels of the fly-by-wire-system 31 have determined that the specific TMR is not experiencing a fault. Again, it will be readily apparent to one skilled in the art that this process avoids nuisance condemnation of the specific TMR. TXVLD is then stored in memory of the MPU 54 for use with other PFC functions as shown in block 270 such as the PFC's input signal management function which would preclude the use of data from the specific TMR if TXVLD for the specific TMR is false.

As illustrated in FIG. 4C, cross-channel consolidation is synchronously performed in each lane 46, 48 and 50 of the own channel. Consequently, each lane of the own channel produces a TXVLD signal associated with the specific TMR. The status of TXVLD is anticipated to be the same between lanes within a channel.

Figure 11:
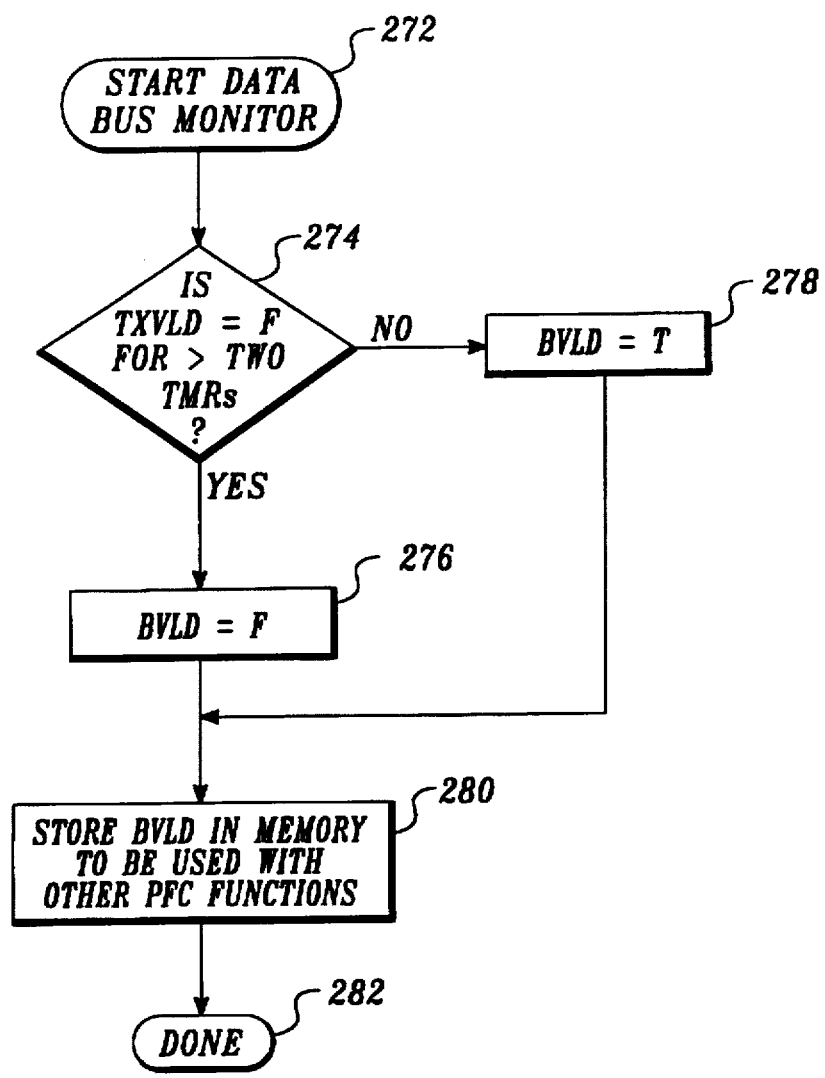
FIG. 11 is a flowchart showing the steps used to determine if the global communications bus is experiencing a fault.

Returning now to FIG. 4C, the TXVLD signal determined using the cross-channel consolidation in block 250 is then used by a number of other functions to determine if the TMR is experiencing an intermittent or constant fault, or if the global communication bus 34 is actually experiencing the fault. In block 272, the MPU 54 of the own lane performs a data bus monitoring function. The logic employed by the MPU 54 to perform this function is shown in more detail FIG. 11. The logic begins in decision block 274 where it determines if TXVLD has been set to false for more than two TMRs transmitting on a specific bus, either the left bus 33, the center bus 35 or the right bus 37. If so, in probability, the TXVLD has been set to false due to an intermittent or permanent fault of the global communication bus 34. Consequently, a bus valid signal (BVLD) is set to false in block 276 indicating that the specific data bus 33, 35 or 37 upon which the specific TMR is transmitting is experiencing a fault. Otherwise, the BVLD is set to true in block 278. In block 280, BVLD is stored in the MPU 54 memory of the own lane so that it may be used by other PFC functions such as the PFC input signal management function, which will invalidate all messages sent via the faulty data bus 33, 35 or 37, if BVLD has been set to false for an LRU transmitting on a specific data bus.

Figure 12:
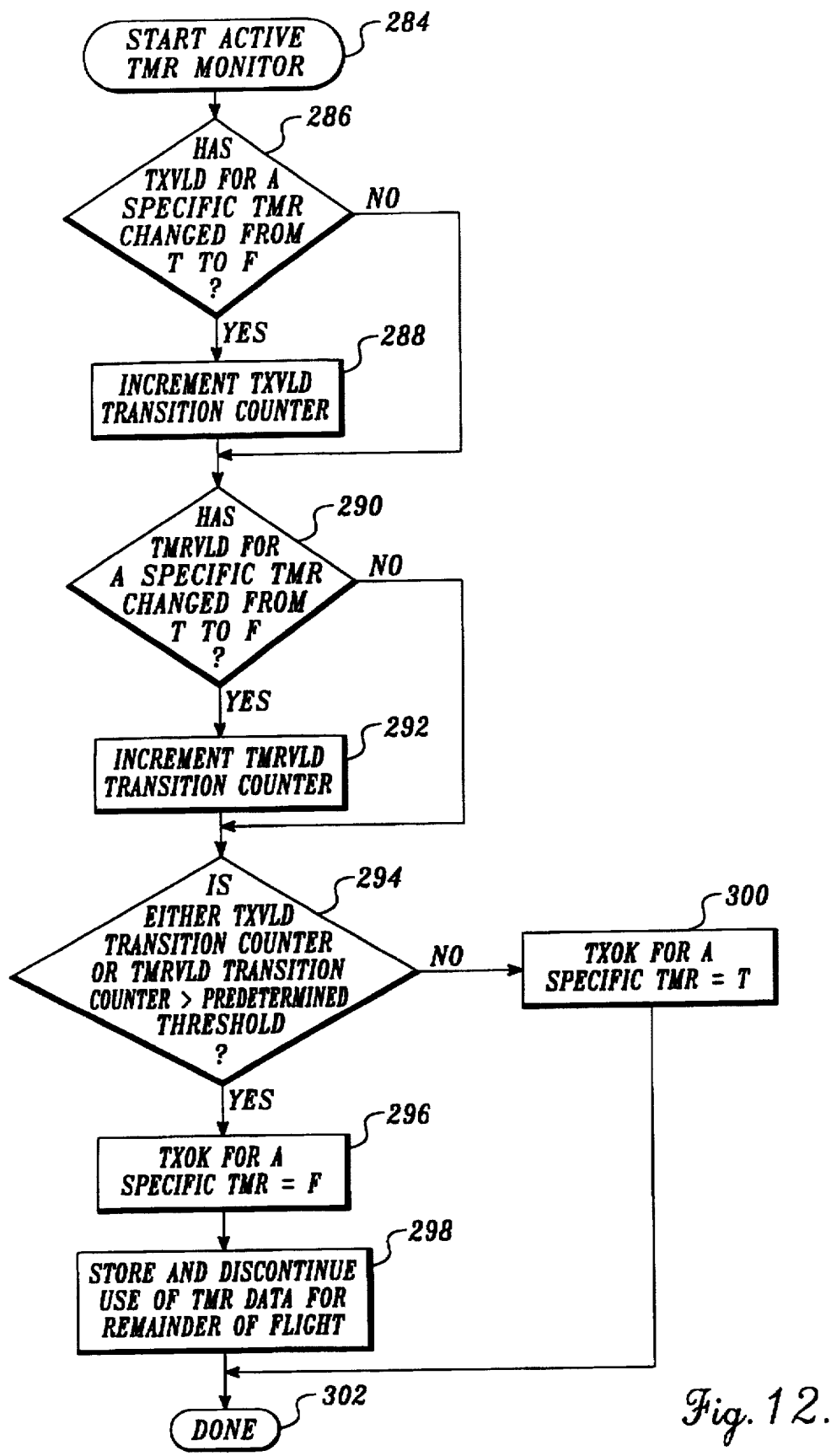
FIG. 12 is a flowchart showing the steps used to determine if an LRU or the global communications bus is experiencing intermittent faults.

Referring to FIG. 4C once again, after the data bus monitoring function in block 272 is performed, the MPU 54 of the own lane performs an active TMR monitoring function in block 284. The logic used by the MPU to perform this function is shown in more detail in FIG. 12. The logic begins in decision block 286 where it determines if TXVLD for the specific TMR has changed from a former true value to a present false value. If so, in block 288 a TXVLD transition counter is incremented. The TXVLD transition counter keeps track of the times TXVLD changes from true to false. If the result of decision block 286 is negative, the TXVLD transition counter is not incremented and the logic simply proceeds to decision block 290.

In decision block 290 the logic determines if an active transmitter valid signal (TMRVLD) for the specific TMR has changed from a former true value to a present false value. As will be described below, TMRVLD indicates whether the specific TMR is still actively transmitting messages 78 to the own channel. If the specific TMR is not, TMRVLD will have been set to false. Otherwise, TMRVLD will have been set to true. If the result of decision block 290 is positive, an TMRVLD transition counter is incremented in block 292. The TMRVLD transition counter keeps track of the number of times TMRVLD changes from true to false. If the result of decision block 290 is negative, the TMRVLD transition counter is not incremented and the logic proceed directly to decision block 294.

In decision block 294 the logic determines if either the TXVLD or the TMRVLD transition counter is greater than a fifth predetermined threshold. The fifth predetermined threshold is equivalent to a maximum number of transitions allowed in a given time period. It will be appreciated that, the frequent transition of true to false of TMRVLD within an airplane flight indicates the existence of an intermittent fault in the specific TMR, possibly due to a loose connection to the global communication bus 34. On the other hand, frequent transition of TXVLD indicates an intermittent fault in the global communication bus 34. If the result of decision block 294 is positive, a transmitter okay signal (TXOK) is set to false in block 296. In block 298, the MPU 54 of the own lane latches any data associated with the specific TMR in its memory and use of the TMR data is discontinued for the remainder of the flight. If the result of decision block 294 is negative, however, the logic proceeds to block 300 where TXOK for the specific TMR is set to true.

Figure 13:
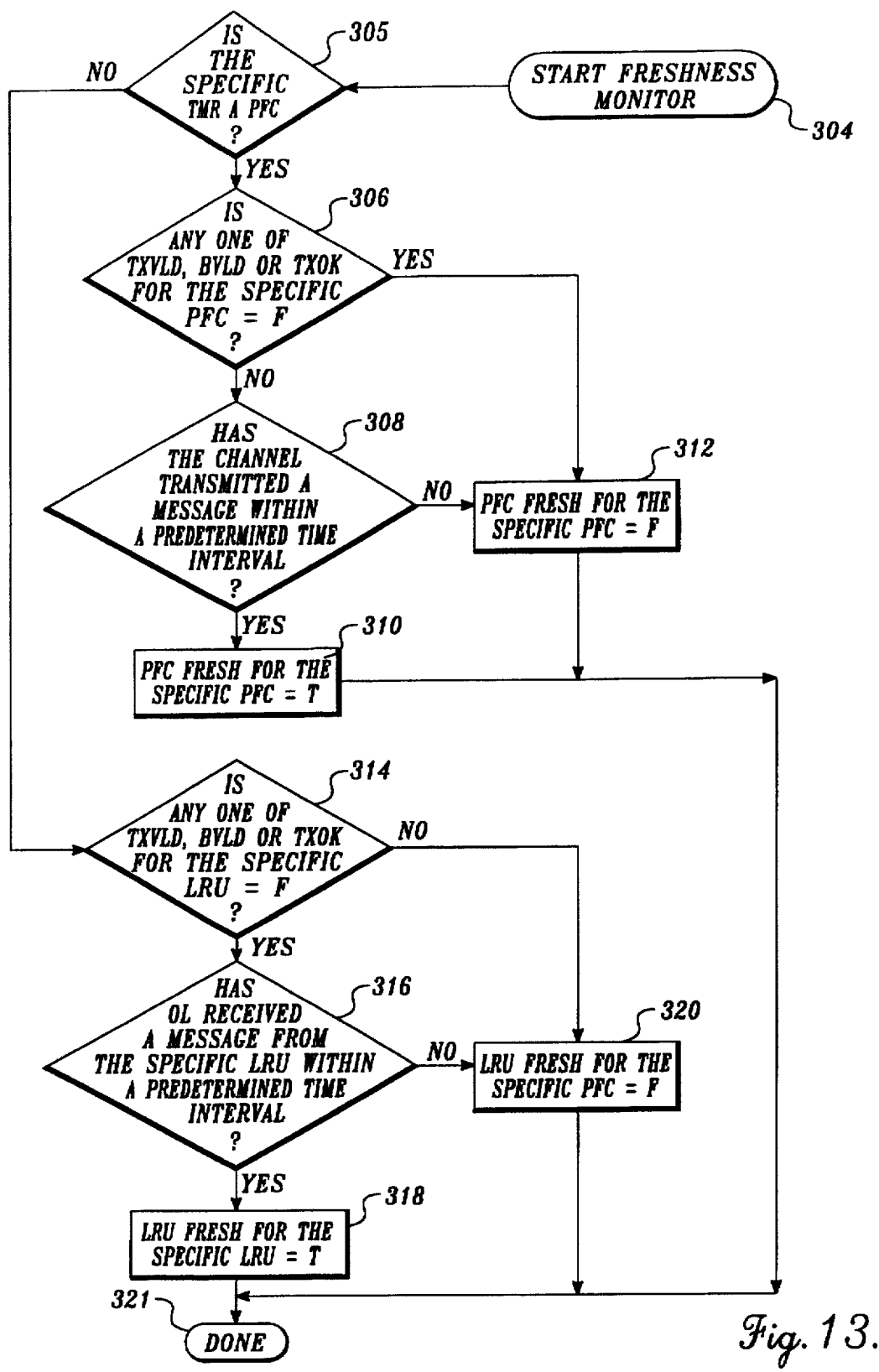
FIG. 13 is a flowchart showing the steps to determine if the PFCs and the LRUs are active and communicating via the global communication bus.

Returning again to FIG. 4C, once TXVLD, BVLD and TXOK have been determined by the own lane, MPU 54 uses the signals to perform a freshness monitoring function in block 304. The freshness monitoring function determines if each channel 40, 42 and 44 is still actively transmitting messages 78 to the other channels of the fly-by-wire system 31 and if the specific TMR is still actively transmitting messages to the own channel. The logic employed by the freshness monitoring function is illustrated in FIG. 13. As will be better appreciated from the following description of FIG. 13 the logic shown in blocks 305 through 315 determines if each channel 40, 42 and 44 is still actively transmitting messages, while the logic shown in blocks 316 through 320 determines if the specific TMR is still actively transmitting messages.

The logic FIG. 13 begins in decision block 305 where it determines if the specific TMR being monitored is a specific PFC. If so, the logic proceeds to block 306, where it determines if any one of TXVLD, BVLD and TXOK associated with the specific PFC has been set to false. If so, the specific PFC may be experiencing a fault. As a result, a PFC FRESH signal indicating a possible fault is set to false in block 312. However, if the result of decision block 306 is negative, the logic proceeds to decision block 308 where it determines if the specific PFC has transmitted a message 78 to either of the other channels within a predefined time interval. If so, PFC FRESH is set to true in block 310, indicating that the specific PFC is still actively transmitting messages. If the result of decision block 312 is negative, PFC FRESH is set to false in block 308 indicating that the specific PFC may be inactive. Once PFC FRESH has been set, the logic ends in block 321. As will be readily apparent to those skilled in the art and others from the preceding discussion if the specific PFC being monitored is the own channel, PFC FRESH represents the active status of the own channel and can be specifically identified as PFC FRESH$_{OC}$. Similarly, if the specific PFC being monitored is the other channel 1 or the other channel 2, PFC FRESH$_{OC1}$ or PFC FRESH$_{OC2}$, respectively represent the status of the channel.

If the result of decision block 305 is negative, the specific TMR is actually a specific LRU rather than a specific PFC. In this case, the logic bypasses blocks 306 through 312, and proceeds to blocks 314 through 320, which determine if the specific LRU is still actively transmitting messages to the own channel via the global communication bus 34. More specifically, in decision block 314, the logic determines if any one of TXVLD, BVLD and TXOK associated with the specific LRU has been set to false. If so, the specific LRU may be experiencing a fault. As a result, an LRU FRESH signal indicating a possible fault is set to false in block 320. However, if the result of decision block 314 is negative, the logic proceeds to decision block 316 where it determines if the own lane has received a message 78 from the specific LRU within the predetermined time interval. If so, LRU FRESH is set to true in block 318 indicating that the specific LRU is still in communication with the own channel. Otherwise, LRU FRESH is set to false in block 320 indicating that the specific LRU may be completely inactive. The freshness monitoring function then ends in block 321.

As shown in FIG. 4C, once the freshness monitoring function in block 304 has ended, PFC FRESH and LRU FRESH are used by other PFC functions. More specifically, PFC FRESH is used in block 322 by other PFC functions such as PFC input signal management which may shut down a channel if it is not actively transmitting messages 78. The specific PFC FRESH signals, PFC FRESH$_{OC}$, PFC FRESH$_{OC1}$, and PFC FRESH$_{OC2}$ are also used by the MPU 54 of the own lane to qualify the lane majority opinions, GFF$_{OC}$, GFF$_{OC1}$, and GFF$_{OC2}$ in blocks 194, 204 and 206. Both PFC FRESH and LRU FRESH are used by the MPU 54 of the own lane to perform an inactive TMR monitoring function in block 324, wherein the inactive TMR monitoring function confirms if the specific PFC or LRU is completely inactive.

Figure 14:
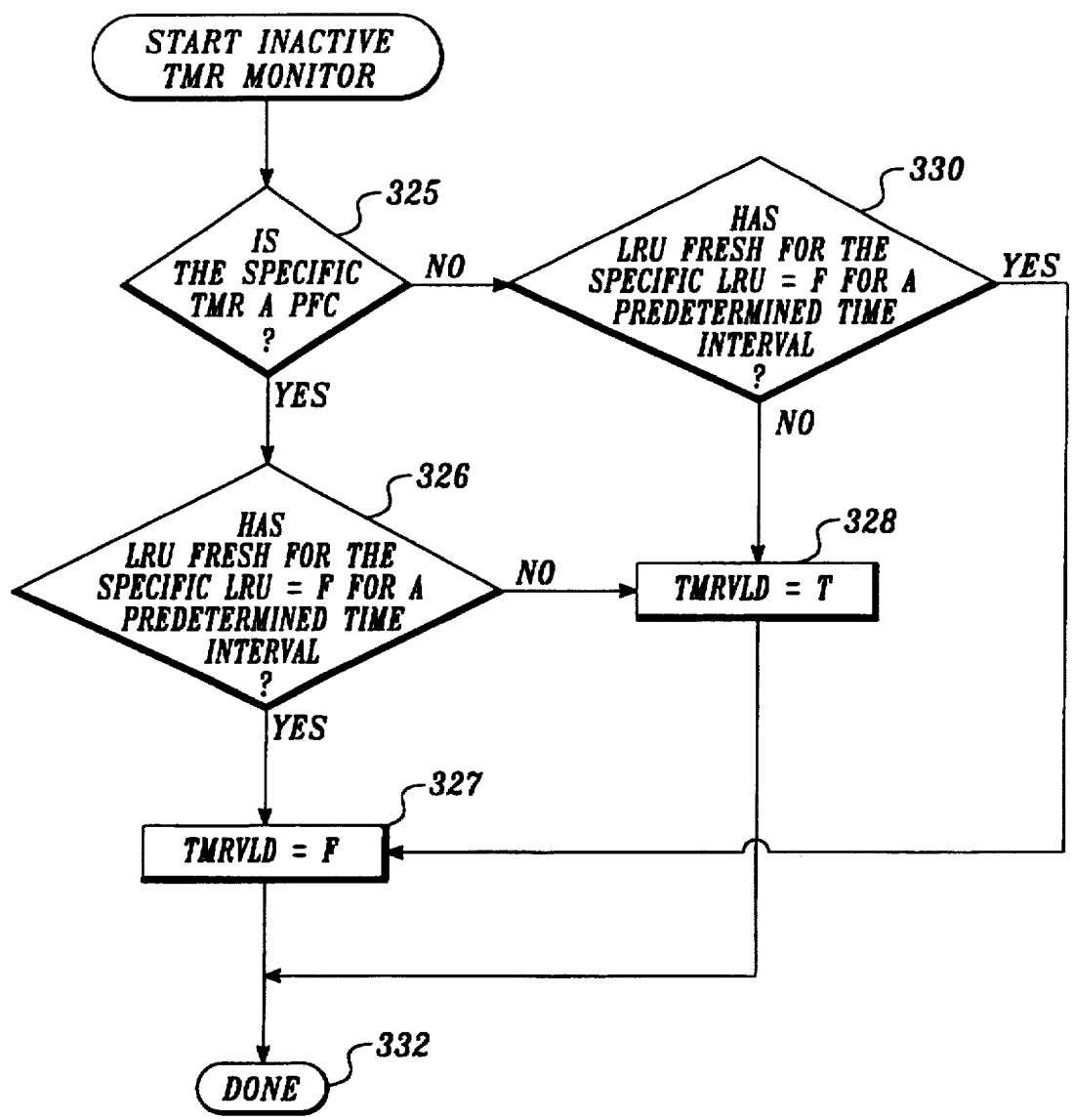
FIG. 14 is a flowchart showing the steps used to determine if an LRU is inactive.

The logic employed by the MPU 54 of the own lane to perform the inactive LRU monitoring function in block 324 is shown in more detail in FIG. 14. The logic begins in decision block 325 where it determines if the specific TMR being monitored is a specific PFC. If so, the logic proceeds to decision block 326 where it determines if PFC FRESH for the specific PFC has persistently been set to false, i.e., if PFC FRESH has been set to false for a predetermined time interval. In the preferred embodiment of the present invention, the predetermined time interval is approximately 2.5 minutes in duration. Those of ordinary skill in the art will appreciate that the time interval may be varied in accordance with fly-by wire system parameters as necessary in order to achieve the desired level of integrity. If PFC FRESH has been set to false for more than 2.5 minutes, the logic determines that the specific PFC is in all probability inactive. As a result, the active transmitter valid signal (TMRVLD) mentioned above is set to false in block 327. Otherwise, TMRVLD is set to true in block 328.

If the result of decision block 325 is negative, the specific TMR is actually a specific LRU rather than a specific PFC. In this case, the logic bypasses decision block 326 and proceeds decision block 330. In decision block 330, the logic determines if LRU FRESH for the specific LRU has persistently been set to false for the predetermined time interval, i.e., if LRU FRESH has been set to false for a time interval such as 2.5 minutes. If LRU FRESH has been set to false for more than the time interval. The logic determines that the specific LRU is in all probability inactive. As a result, the active transmitter valid signal (TMRVLD) mentioned above is set to false in block 327. Otherwise, TMRVLD is set to true in block 328.

As described above, TMRVLD is used by the active TMR monitoring function 284 to determine if the specific transmitter is experiencing an intermittent fault as opposed to being completely inactive. A false value indicates that the specific TMR likely has a broken or loose connection to the data bus 34. However, if TMRVLD changes often from true to false, it is possible that the specific TMR is experiencing only an intermittently broken or loose connection to the communication bus.

Those of ordinary skill in the art will appreciate from FIGS. 4A, 4B and 4C, that virtually the same functions as described above are being performed by every lane 46, 48 and 50 of each channel 40, 42 and 44 in the fly-by-wire system. Therefore, each lane of each channel ultimately identifies faults in each TMR, i.e., in each LRU 30 or 38, PFC 40, 42 and 44, lane 46, 48 and 50, and data bus 33, 35 and 37 of the fly-by-wire system 31. By means of the present invention, each lane of each channel also avoid nuisance condemnation of these aircraft components, thus obtaining a high level of integrity and promoting aircraft component availability in the fly-by-wire system.

While the presently preferred embodiment of the present invention has been illustrated and described, it will be appreciated that within the scope of the appended claims various changes can be made therein without departing from the spirit of the invention. For example, although the present invention has been described as employed by a fly-by wire system having three redundant channels, it will be appreciated by those of ordinary skill in the art that the present invention may also be used by systems having more than three channels. Similarly, the present invention may be employed in systems wherein each channel may have more than three lanes. In such cases, the definition of a majority opinion, i.e., does a majority opinion constitute half of the lanes if there is an even number of lanes or does it require a simple majority, will be decided by design specifications. Further, it will be appreciated that the present invention may also be applied to any multi-channel system and thus, should not be limited to fly-by-wire systems or any other type of avionic system.

The embodiments of the invention in which an exclusive property or privilege is claimed are defined as follows:

1. A method for determining faults in a control system, wherein the control system comprises a global bus that includes a plurality of data busses and a plurality of transmitters coupled to the global bus for transmitting data via the global bus, the plurality of transmitters including a plurality of line replaceable units and a plurality of computer channels, each channel containing a plurality of lanes coupled by a private bus, each lane of each channel being coupled to each data bus, and each line replaceable unit being coupled to one of the data busses, the method comprising:

for each channel,
 (a) generating a lane majority opinion that indicates whether a majority of the lanes of the channel have detected a fault in the transmission of data by a transmitter via the global bus;
 (b) transmitting the lane majority opinion to the other channels via the global bus; and
 (c) generating a channel majority opinion for said transmitter as a function of the lane majority opinion generated by the channel and the lane majority opinions transmitted via the global bus, the channel majority opinion indicating whether a majority of the channels have detected said fault in the transmitter.

2. The method of claim 1, wherein generating a lane majority opinion comprises:
 (a) generating an error signal, whose state indicates whether data transmitted by the transmitter via the global bus has excessive errors;
 (b) transmitting the error signal to the other lanes of the channel via the private bus of the channel; and
 (c) determining if a majority of the lanes have persistently generated an error signal whose state indicates whether data transmitted by the transmitter via the global bus has excessive errors.

3. The method of claim 2, wherein each channel qualifies its lane majority opinions by:
 (a) receiving lane majority opinions from each channel via the global bus; and
 (b) for each lane majority opinion received,
  (i) determining if the channel is experiencing a transmission fault by evaluating a channel freshness signal indicating whether the channel from which the lane majority opinion was received is active;
  (ii) if the channel is not experiencing a transmission fault, generating a qualified lane majority opinion for the channel if the majority of lanes of the channel have detected a fault in the transmitter; and
  (iii) after the qualified majority opinion for the channel is generated, transmitting the qualified majority opinion for the channel to the other lanes of the channel via the private bus of the channel.

4. The method of claim 3, further comprising each channel generating a final lane majority opinion indicating whether a majority of the lanes of the channel have continued to detect the fault in the transmitter after qualifying the lane majority opinion for the channel by:
 (a) receiving a set of qualified lane majority opinions from each channel, each channel's set comprising the qualified lane majority opinion of the channel as qualified and transmitted by each lane of the channel; and
 (b) for each channel's set of qualified lane majority opinions, generating the final lane majority opinion of the channel as a function of the channel's set of qualified lane majority opinions.

5. The method of claim 4, wherein generating the final lane majority opinion of the channel as a function of the channel's set of qualified lane majority opinions further comprises determining if a majority of the lanes have persistently generated a qualified lane majority opinion indicating that the transmitter is experiencing a fault.

6. The method of claim 5, wherein generating the channel majority opinion further comprises:
for each lane of the channel, determining if a majority of the channels have persistently generated a final majority opinion indicating that the transmitter is experiencing a fault.

7. The method of claim 6, further comprising generating a bus valid signal as a function of the channel majority opinion, wherein the bus valid signal indicates whether the data bus to which the transmitter is connected is experiencing a fault.

8. The method of claim 7, further comprising generating a satisfactory transmitter signal as a function of the channel majority opinion and an inactive transmitter signal indicating whether the transmitter is inactive, the satisfactory valid signal indicating whether the transmitter is experiencing an intermittent fault.

9. The method of claim 8, further comprising generating the channel freshness signal as a function of the majority channel opinion, the bus valid signal and the satisfactory transmitter signal by:
 (a) determining if the transmitter is a channel;
 (b) if the transmitter is a channel, determining if any one of the majority channel opinion, the bus valid signal or the satisfactory transmitter signal indicates that a fault has been detected; and
 (c) determining if the transmitter has transmitted a message within a predetermined time interval if a fault has been detected.

10. The method of claim 9, further comprising generating a line replaceable unit freshness signal as a function of the majority channel opinion, the bus valid signal and the satisfactory transmitter signal by:
 (a) if the transmitter is not a channel and thus, is a line replaceable unit, determining if any one of the majority channel opinion, the bus valid signal or the satisfactory transmitter signal indicates that a fault has been detected; and
 (b) determining if the lane has received a message from the transmitter within the predetermined time interval if a fault has been detected.

11. The method of claim 10, further comprising generating the inactive transmitter signal as a function of the channel freshness signal and the line replaceable unit freshness signal by:
 (a) determining if the transmitter is a channel;
 (b) if the transmitter is a channel, determining if the channel freshness signal has indicated that the transmitter has not transmitted a message within a predefined time interval;
 (c) if the transmitter is a line replaceable unit, determining if the line replaceable unit signal has indicated that the lane has not received a message from the line replaceable unit within the predefined time interval.

12. The method of claim 11, wherein generating the satisfactory transmitter signal as a function of the channel majority opinion and the inactive transmitter signal further comprises:
 (a) determining if the channel majority opinion persistently changes from indicating that the transmitter is not experiencing a fault to indicating that the transmitter is experiencing a fault; and (b) determining if the inactive transmitter signal persistently changes from indicating that the transmitter is active to indicating that the transmitter is inactive.

13. The method of claim 2, wherein generating a lane majority opinion for the channel further comprises generating a lane fault signal indicating whether the lane is possibly experiencing a fault if only one lane in the channel has generated an error signal indicating that the transmitter is transmitting a message having excessive errors via the global bus.

14. The method of claim 13, further comprising confirming that the lane has experienced a fault by determining if the lane has persistently generated lane fault signals indicating that the lane is possible experiencing a fault.

15. The method of claim 4, wherein generating a final lane majority opinion for the channel further comprises generating a final lane fault signal indicating whether the lane is possibly experiencing a fault if only one lane in the channel has generated an error signal indicating that the transmitter is transmitting a message having excessive errors via the global bus.

16. The method of claim 15, further comprising confirming that the lane has experienced a fault by determining if the lane has persistently generated final lane fault signals indicating that the lane is possible experiencing a fault.

17. A multi-channel system for, monitoring and identifying faults experienced by elements of the system; the multi-channel system comprising:

(a) a global bus comprising a plurality of data busses;

(b) a plurality of line replaceable units coupled to the global bus such that each line replaceable unit is connected to one of the data busses, each line replaceable unit forming a transmitter that transmits messages via the global bus; and (c) a plurality of computer channels coupled to the global bus, each computer channel also forming a transmitter that transmits messages via the global bus, each channel containing a plurality of lanes coupled by a private bus, each lane comprising a power supply, a processor and an interface to the global bus, one lane of each channel comprising a command lane that transmits messages via the global bus, and each computer channel detecting faults in the multi-channel system such that:

for each transmitter connected to the global bus, the processor of each lane of the channel generates:

(i) a lane majority opinion associated with the transmitter that indicates whether a majority of lanes within the channel have detected a fault in the transmitter communicating via the global bus; and (ii) a channel majority opinion associated with the transmitter as a function of the lane majority opinion for each channel, which indicates whether a majority of the channels have detected a fault in the transmitter.

18. The multi-channel system of claim 17, the processor for each lane of the channel generating the channel majority opinion for the transmitter by:

(a) allowing the command lane of the channel to transmit the lane majority opinion to the other computer channels over global bus via the interface of the command lane;

(b) receiving the lane majority opinion generated by the processor of command lane of each of the other channels; and (c) generating the channel majority opinion as a function of the lane majority opinion generated by the command lane of each channel.

19. The multichannel system of claim 18, the processor of each lane of the channel generating a lane majority opinion of the channel by:

(a) generating an error signal, whose state indicates whether the data transmitted by the global bus has excessive errors;

(b) transmitting the error signal to the other lanes of the channel via the private bus of the channel; and (c) determining if a majority of the lanes have persistently generated an error signal, whose state indicates whether the data transmitted by the transmitter via the global bus has excessive errors.

20. The multi-channel system of claim 19, wherein the processor of each lane qualifies the lane majority opinion for each channel before generating the channel majority opinion:

(a) receiving lane majority opinion from each channel via the global bus; and (b) for each lane majority opinion received, (i) determining if the channel is experiencing a transmission fault by evaluating a channel freshness signal indicating whether the channel from which the lane majority opinion was received is active;

(ii) if the channel is not experiencing a transmission fault, generating a qualified lane majority opinion for the channel if the majority of lanes of the channel have detected a fault in the transmitter; and (iii) after the qualified majority opinion for the channel is generated, transmitting the qualified majority opinion for the channel to the other lanes of the channel via the private bus of the channel.

21. The multi-channel system of claim 20, wherein the processor of each lane generates a final lane majority opinion of each channel before generating the channel majority opinion, the final lane majority opinion of each channel indicating whether a majority of the lanes of the channel have continued to detect the fault in the transmitter after the lane majority opinion for the channel has been qualified by:

(a) receiving a set of qualified lane majority opinions from each channel, each channel's set comprising the qualified lane majority opinion of the channel as qualified and transmitted by each lane of the channel; and (b) for each channel's set of qualified lane majority opinions, generating the final lane majority opinion of the channel as a function of the channel's set of qualified lane majority opinions.

22. The multi-channel system of claim 21, wherein the final lane majority opinion of the channel is generated by the processor of each lane by determining if a majority of the lanes have persistently generated a qualified lane majority opinion indicating that the transmitter is experiencing a fault.

23. The multi-channel system of claim 22, wherein the processor of each channel generates the channel majority opinion by:

for each lane of the channel, determining if a majority of the channels have persistently generated a final majority opinion indicating that the transmitter is experiencing a fault.

24. The multi-channel system of claim 23, wherein the processor of each lane generates a bus valid signal as a function of the channel majority opinion, the bus valid signal indicating whether the data bus to which the transmitter is connected is experiencing a fault.

25. The multi-channel system of claim 24, wherein the processor of each lane generates a satisfactory transmitter signal as a function of the channel majority opinion and an inactive transmitter signal indicating whether the transmitter is inactive, wherein the satisfactory valid signal indicates whether the transmitter is experiencing an intermittent fault.

26. The multi-channel system of claim 25, wherein the processor of each lane generates the channel freshness signal as a function of the majority channel opinion, the bus valid signal and the satisfactory transmitter signal by:
 (a) determining if the transmitter is a channel;
 (b) if the transmitter is a channel, determining if any one of the majority channel opinion, the bus valid signal or the satisfactory transmitter signal indicates that a fault has been detected; and
 (c) determining if the transmitter has transmitted a message within a predetermined time interval if a fault has been detected.

27. The multi-channel system of claim 26, the processor of each lane generates a line replaceable unit freshness signal as a function of the majority channel opinion, the bus valid signal and the satisfactory transmitter signal by:
 (a) if the transmitter is not a channel and thus, is a line replaceable unit, determining if any one of the majority channel opinion, the bus valid signal or the satisfactory transmitter signal indicates that a fault has been detected; and
 (c) determining if the lane has received a message from the transmitter within the predetermined time interval if a fault has been detected.

28. The multi-channel system of claim 27, the processor of each lane generates the inactive transmitter signal as a function of the channel freshness signal and the line replaceable unit freshness signal by:
 (a) determining if the transmitter is a channel;
 (b) if the transmitter is a channel, determining if the channel freshness signal has indicated that the transmitter has not transmitted a message within a predefined time interval;
 (c) if the transmitter is a line replaceable unit, determining if the line replaceable unit signal has indicated that the lane has not received a message from the line replaceable unit within the predefined time interval.

29. The multi-channel system of claim 28, wherein the processor of each lane generates the satisfactory transmitter signal as a function of the channel majority opinion and the inactive transmitter signal by:
 (a) determining if the channel majority opinion persistently changes from indicating that the transmitter is not experiencing a fault to indicating that the transmitter is experiencing a fault; and
 (b) determining if the inactive transmitter signal persistently changes from indicating that the transmitter is active to indicating that the transmitter is inactive.

30. The multi-channel system of claim 19, wherein the processor of each lane generates a lane fault signal after generating the lane majority opinion if only one lane in the channel has generated an error signal indicating that the transmitter is transmitting a message having excessive errors via the global bus, wherein the lane fault signal indicates whether the lane is possibly experiencing a fault.

31. The multi-channel system of claim 30, wherein the processor of each lane confirms that the lane has experienced a fault by determining if the lane has persistently generated lane fault signals.

32. The multi-channel system of claim 21, wherein the processor of each lane generates a final lane fault signal after generating the final lane majority opinion if only one lane in the channel has generated an error signal indicating that the transmitter is transmitting a message having excessive errors via the global bus, wherein the final lane fault signal indicates whether the lane is possibly experiencing a fault.

33. The multi-channel system of claim 32, wherein the processor of each lane confirms that the lane has experienced a fault by determining if the lane has persistently generated final lane fault signals indicating that the lane is possible experiencing a fault.

34. A method for detecting transmitter faults in a control system having a plurality of control channels coupled to a global communication medium, wherein each channel contains a plurality of lanes for processing data, the method comprising:
 for each channel:
 (a) generating a lane opinion in each lane which indicates whether the lane has detected a transmitter fault;
 (b) performing a cross-consolidation in each lane of the lane opinions to produce a lane majority opinion which indicates whether a majority of the lanes of the channel have detected the transmitter fault; and
 (c) performing a cross-consolidation in each lane of the lane majority opinions for each channel to produce a channel majority opinion which indicates whether a majority of the channels coupled to the global communication medium have detected the transmitter fault.

35. The method of claim 34, wherein generating a lane opinion in each lane comprises generating an error signal indicating whether data transmitted via the global communication medium has excessive errors.

36. The method of claim 35, wherein performing a cross-consolidation in each lane to produce the lane majority opinion comprises determining whether a majority of the lanes of the channel have persistently generated the error signal.

37. The method of claim 34, wherein performing a cross-consolidation of the lane majority opinions to produce the channel majority opinion comprises:
 (a) qualifying the lane majority opinion of each channel to ensure that the channel is not experiencing a fault itself;
 (b) generating a final lane majority opinion which indicates whether a majority of the lanes of the channel have persistently generated a qualified lane majority opinion.

38. The method of claim 37, wherein performing a cross-consolidation of the lane majority opinions comprises determining in each lane of the channel whether a majority of the channels have persistently generated a final lane majority opinion.

* * * * *